United States Patent
Mandelker

(10) Patent No.: US 12,514,528 B2
(45) Date of Patent: Jan. 6, 2026

(54) MEDICAL IMAGE DIAGNOSTIC PREDICTOR

(71) Applicant: Eiran Mandelker, Allentown, PA (US)

(72) Inventor: Eiran Mandelker, Allentown, PA (US)

( * ) Notice: Subject to any disclaimer, the term of this patent is extended or adjusted under 35 U.S.C. 154(b) by 207 days.

(21) Appl. No.: 18/399,188

(22) Filed: Dec. 28, 2023

(65) Prior Publication Data

US 2024/0215938 A1 Jul. 4, 2024

Related U.S. Application Data

(60) Provisional application No. 63/478,258, filed on Jan. 3, 2023.

(51) Int. Cl.
*A61B 6/00* (2024.01)
*A61B 6/46* (2024.01)
(Continued)

(52) U.S. Cl.
CPC ............ *A61B 6/5205* (2013.01); *A61B 6/465* (2013.01); *A61B 6/5235* (2013.01); *A61B 6/566* (2013.01);
(Continued)

(58) Field of Classification Search
CPC ..... A61B 6/5205; A61B 6/5235; A61B 6/465; A61B 6/566; G06N 20/00;
(Continued)

(56) References Cited

U.S. PATENT DOCUMENTS

2019/0340753 A1 11/2019 Brestel et al.
2021/0090718 A1 3/2021 Truong
(Continued)

FOREIGN PATENT DOCUMENTS

CN 110782422 A 2/2020
CN 112598661 A 4/2021
(Continued)

OTHER PUBLICATIONS

Maad M. Mijwil & Karan Aggarwal, "A diagnostic testing for people with appendicitis using machine learning techniques" URL: https://link.springer.com/article/10.1007/s11042-022-11939-8, Published/Accessed: Jan. 24, 2022.
(Continued)

*Primary Examiner* — Don K Wong
(74) *Attorney, Agent, or Firm* — Merchant & Gould P.C.

(57) ABSTRACT

In general, the present disclosure is directed to systems and methods for detecting features in x-ray images that are indicative of a condition. In one aspect a method of using a machine learning algorithm to analyze x-ray images to detect features indicative of conditions is disclosed. The method comprising receiving training x-ray images with paired higher detailed images, annotating the training x-ray images based on features identified in higher detailed images, training a machine learning model using the training x-ray images, receiving an x-ray image captured at an x-ray machine, and generating a diagnosis prediction by processing the x-ray image with the machine learning model to detect one or more features in the x-ray image indicative of one or more conditions.

22 Claims, 17 Drawing Sheets

(51) Int. Cl.
*G06N 20/00* (2019.01)
*G16H 10/60* (2018.01)
*G16H 30/20* (2018.01)
*G16H 30/40* (2018.01)
*G16H 50/20* (2018.01)
*G16H 70/00* (2018.01)

(52) U.S. Cl.
CPC ............. *G06N 20/00* (2019.01); *G16H 10/60* (2018.01); *G16H 30/20* (2018.01); *G16H 30/40* (2018.01); *G16H 50/20* (2018.01); *G16H 70/00* (2018.01)

(58) Field of Classification Search
CPC . G06T 2207/10081; G06T 2207/10116; G06T 2207/20081; G06T 2207/20084; G06T 7/0014; G06T 7/0012; G06T 7/74; G16H 10/60; G16H 30/40; G16H 50/20; G16H 70/00
See application file for complete search history.

(56) References Cited

U.S. PATENT DOCUMENTS

| | | |
|---|---|---|
| 2021/0150710 A1* | 5/2021 | Hosseinzadeh Taher ................... G06V 10/764 |
| 2021/0342638 A1 | 11/2021 | Ghesu et al. |
| 2022/0180514 A1 | 6/2022 | Vlasimsky |
| 2022/0292742 A1 | 9/2022 | Mailhe et al. |

FOREIGN PATENT DOCUMENTS

| | | |
|---|---|---|
| EP | 3944186 A1 | 1/2022 |
| JP | 2021013736 A | 2/2021 |
| KR | 1020210045923 A | 4/2021 |

OTHER PUBLICATIONS

Tan Tao et. al., Multi-modal trained artificial intelligence solution to triage chest x-ray for COVID-19 using pristine ground-truth, versus radiologists, Neurocomputing, vol. 485, Feb. 16, 2022, 22 pages.
Vignav Ramesh et. al., Covid-19 Lung Lesion Segmentation Using a Sparsely Supervised Mask R-CNN on Chest X-rays Automatically Computed from Volumetric CTs, ARXIV.Org., May 20, 2021, 22 pages.
PCT International Searching Authority, International Search Report and Written Opinion for Application No. PCT/US2023/086226 mailed on Apr. 9, 2024, 19 pages.

* cited by examiner

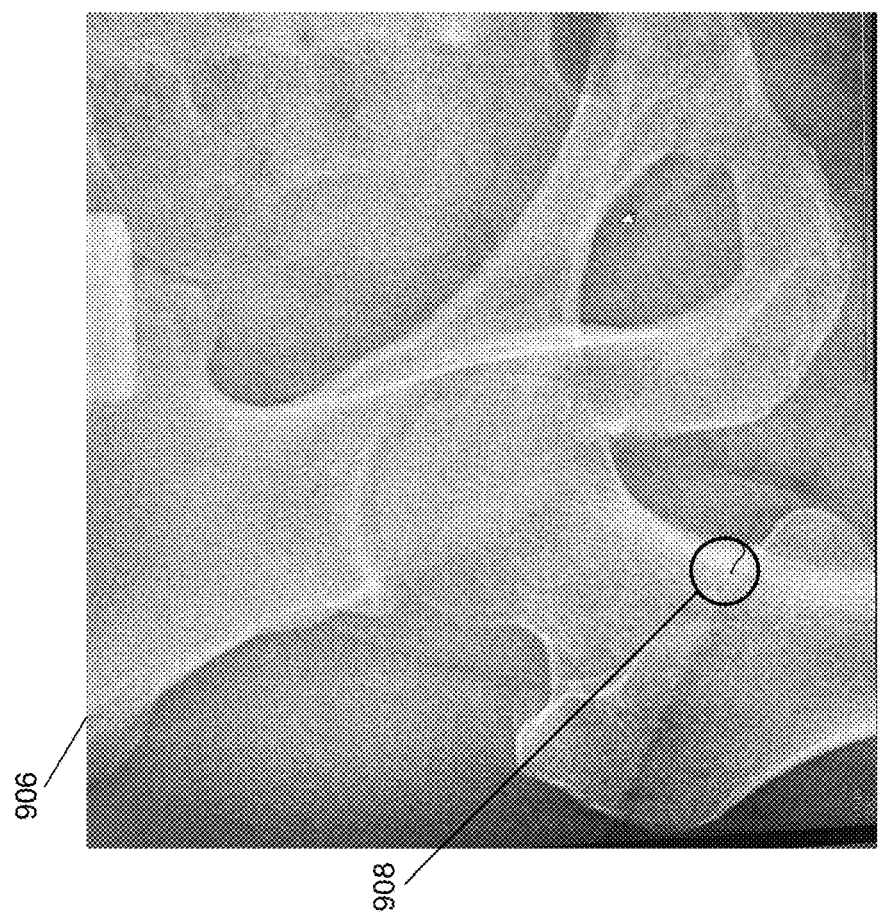
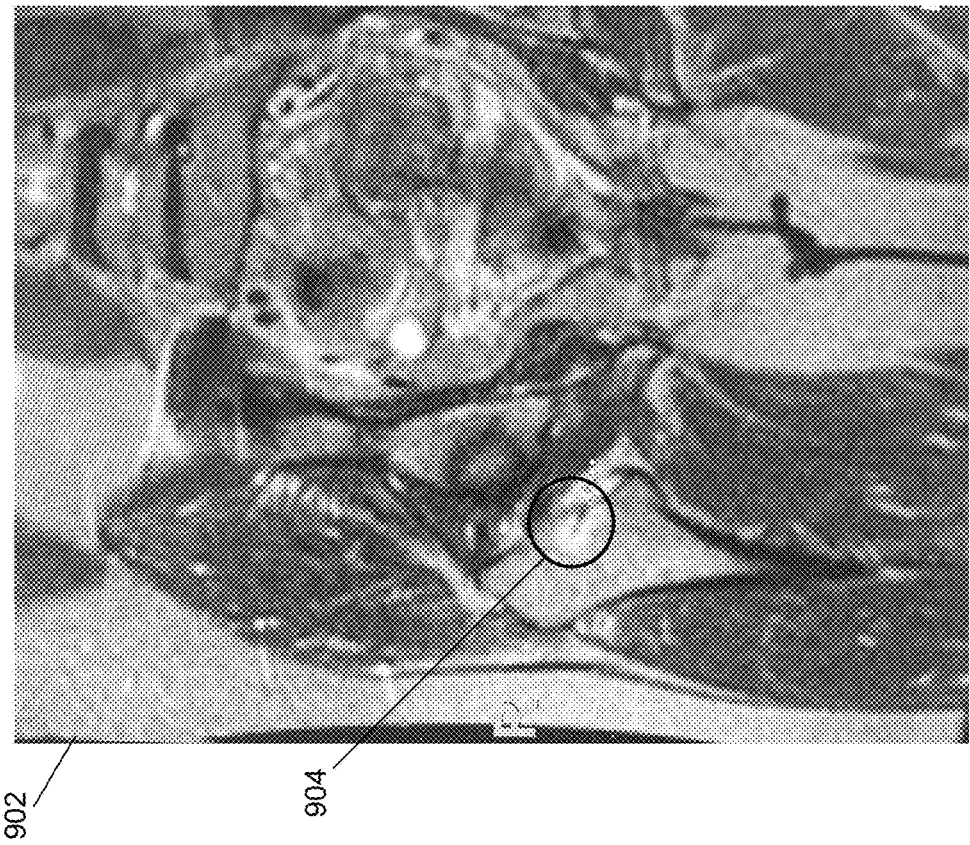
FIG. 9B
FIG. 9A

MEDICAL IMAGE DIAGNOSTIC PREDICTOR

CROSS-REFERENCE TO RELATED APPLICATION(S)

This application claims priority to U.S. Application No. 63/478,258, filed on Jan. 3, 2023, entitled MEDICAL IMAGE DIAGNOSTIC PREDICTOR, the disclosure of which is hereby incorporated by reference in its entirety.

BACKGROUND

Radiology is a branch of medicine that uses imaging techniques to diagnose and treat physiological conditions. A radiologist is a doctor that studies the images produced by the imaging techniques and reports on the findings. Common imaging technologies include x-ray, computed tomography (CT), magnetic resonance imaging (MRI), and ultrasound (US).

X-rays are the fastest and most accessible form of imaging. In many instances the first image taken when examining a patient is an x-ray. X-rays are primarily used to evaluate the chest and abdomen as well as bones and teeth (which appear as white on the x-ray image). Softer tissues such as cartilage, ligaments, and tendons are either not visible in x-ray images or are difficult to visualize and show up as a faint gray color that is typically not characterizable, appreciated, or commented on by the radiologist.

MRI and CT scans are imaging techniques that typically provide more detailed information of body structures than x-rays. MRI and CT scans permit radiologists to carefully inspect bones, soft tissues, and other structures within the body.

Many radiologists have large quantities of images to review in a limited amount of time. For example, some radiologists may only have one minute to review three x-rays of a patient. Due to the limited detail of the x-ray and the limited time available to inspect the x-rays, radiologists and other doctors may overlook certain conditions such as subtle fractures in a bone and may not even attempt to look for soft tissue damage.

SUMMARY

In general terms, the present disclosure is directed to systems and methods for detecting features in x-ray images that are indicative of a condition. In some embodiments a machine learning algorithm is used to analyze x-ray images to detect features indicative of one or more conditions.

In one aspect a method of using a machine learning algorithm to analyze x-ray images to detect features indicative of conditions is disclosed. The method comprising receiving training x-ray images with paired higher detailed images, annotating the training x-ray images based on features identified in the higher detailed images, training a machine learning model using the training x-ray images, receiving an x-ray image captured at an x-ray machine, and generating a diagnosis prediction by processing the x-ray image with the machine learning model to detect one or more features in the x-ray image indicative of one or more conditions.

In another aspect a diagnosis system is disclosed. The diagnosis system comprising an x-ray machine configured to take an x-ray image and a computing system. The computing system including a communication interface to connect with the x-ray machine, at least one processor, and at least one memory device storing instructions which, when executed by the at least one processor, cause the computing system to receive the x-ray image from the x-ray machine via the communication interface and process the x-ray image with a machine learning model to generate a diagnosis prediction, wherein the machine learning model is trained using annotated x-ray images to detect one or more features in the x-ray image that are indicative of one or more conditions, where the annotated x-ray images include annotations based on features identified in paired higher detail images.

Yet another aspect is a system for comprising one or more servers with at least one processing device and at least one memory device, the at least one memory device storing instructions which, when executed by the at least one processing device, cause the system to receive annotated training x-ray images, wherein the annotated training x-ray images include annotations based on features identified in paired higher detail images, train a machine learning model using the annotated training x-ray images, receive an x-ray image captured at an x-ray machine, and generate a diagnosis prediction by processing the x-ray image with the machine learning model to detect one or more features in the x-ray image indicative of one or more conditions.

DESCRIPTION OF THE DRAWINGS

The following drawing figures, which form a part of this application, are illustrative of described technology and are not meant to limit the scope of the disclosure in any manner.

FIG. 9A illustrates a magnetic resonance imaging (MRI) image of a stress/insufficiency fracture in a right femur, in accordance with some embodiments of the present disclosure.

FIG. 9B illustrates an x-ray image of the x-ray occult stress/insufficiency fracture in the right femur shown in FIG. 9A, in accordance with some embodiments of the present disclosure.

DETAILED DESCRIPTION

Figure 1:
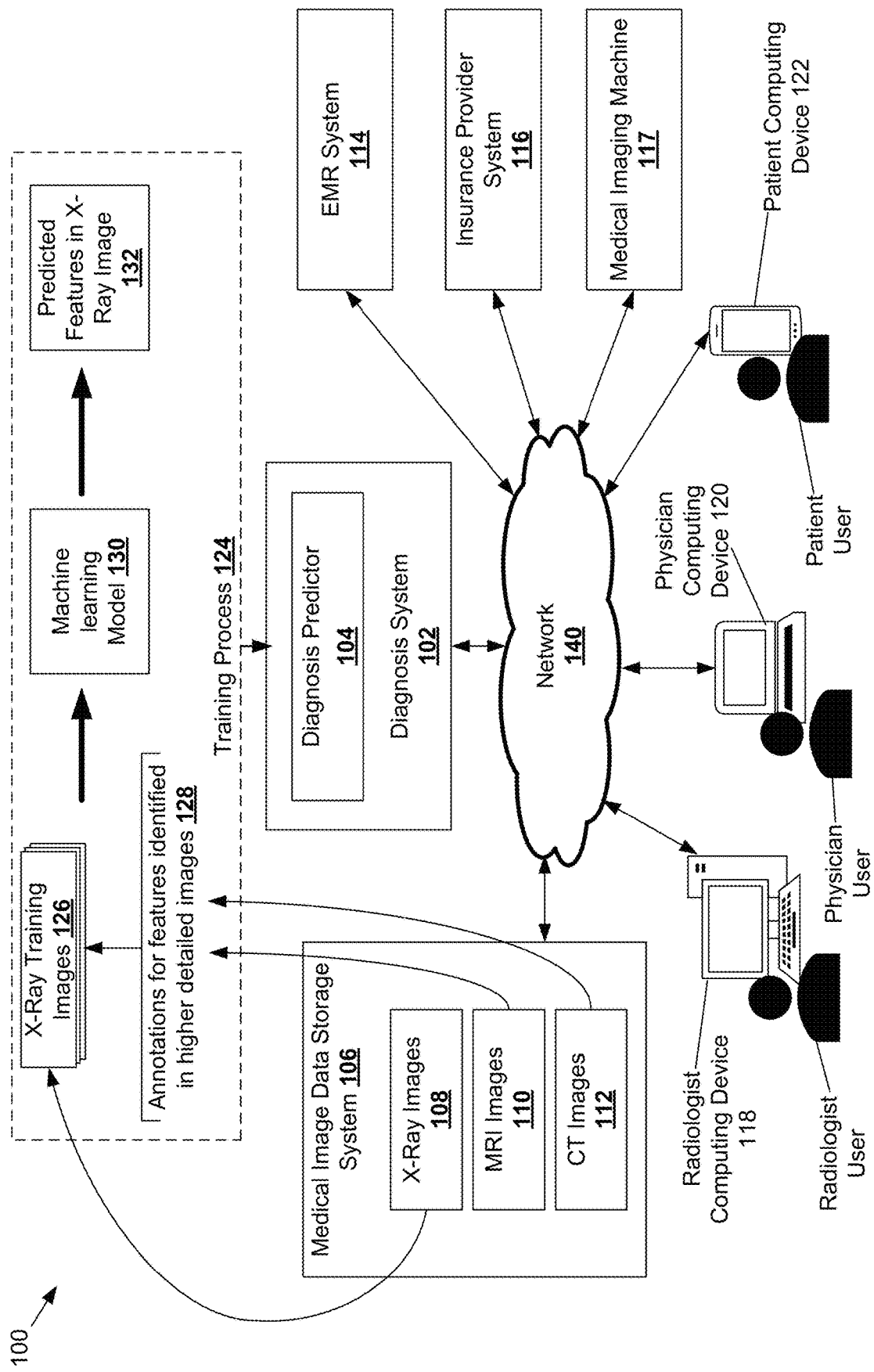
FIG. 1 illustrates an example environment for a diagnosis system, in accordance with some embodiments of the present disclosure.

Various embodiments of the present disclosure will be described in detail with reference to the drawings, wherein like reference numerals represent like parts and assemblies throughout the several views. Additionally, any examples set forth in this specification are not intended to be limiting and merely set forth some of many possible embodiments.

In general terms, the present disclosure is directed to systems and methods for detecting features in x-ray images that are indicative of a condition. In some embodiments, the condition is one which is typically identified using a higher detailed image, such a computed tomography (CT) image or a magnetic resonance imaging (MRI) image. In some embodiments a machine learning algorithm is used to analyze x-ray images to detect features indicative of one or more conditions. In some embodiments, the machine learning model is trained using annotated x-ray images where the annotations are based on abnormalities identified in a paired higher level imaging modality, such as an MRI or CT.

In some embodiments, results from higher detail images are used to identify features in paired x-ray images and to generate training data. For example, the training data can include annotations to x-ray images that identify subtle features of the x-ray images that are subtle and difficult for a human to detect in the x-ray images themselves (x-ray occult) but easily detectable in a higher detailed image. Examples of a higher detailed image include an image from a computed tomography (CT) scan or a magnetic resonance imaging (MRI) Scan. The training data, including the annotations to the x-ray images, is then used to train a machine learning model. In some embodiments, the machine learning algorithm identifies abnormalities in x-ray images with higher accuracy and detection rates than radiologists.

In some instances, MRIs and CTs provide more detailed images than x-rays and as such, many abnormalities are radiographically occult (not visible or very difficult to identify) on x-rays but visible on MRIs and CTs. This includes soft tissue injuries/tears (including of tendons, ligaments, menisci), chest/abdomen/pelvis/brain injuries/tumors, and bone injuries/tumors/lesions (including stress fractures and avascular necrosis). Therefore, identifying abnormalities on an MRI and CT and then subsequently, for machine learning algorithm training purposes, labeling the anatomic region on the x-ray for radiographically occult and non-occult findings (e.g., performed in the same time frame on the same patient) results in more accurate training data. In some embodiments, this will result in machine learning algorithms being able to, in many cases, accurately identify abnormalities that otherwise would have been interpreted as being normal or not identified. Advantages for using this training data to train a machine learning model include generating a model that can result in an earlier diagnosis, a more accurate diagnoses, and, therefore, expedite appropriate treatment that otherwise would potentially be delayed until a follow up more advanced imaging study (such as an MRI or CT) is performed. Additional advantages include quickly guiding the healthcare provider to administer the best care for a patient and reducing costs by eliminating unnecessary treatments and/or additional diagnostic tests (such as an MRI or CT).

In some embodiments, the training process begins by obtaining sets of images that include x-ray images and higher detail images, such as CT or MRI images, depicting the same anatomical structures of a patient as the x-ray images. In some embodiments, a radiologist provides complete annotations of the x-ray images, by identifying both obvious and very subtle features in the x-ray images that are indicative of one or more conditions, such as stress/insufficiency fractures, bone lesions, and tears or wear in (or complete absence of) soft tissues. In some embodiments, the annotations are added automatically using an algorithm and/or a second machine learning model trained to identify conditions visible in the higher detailed image. The annotated data is then provided with the x-ray images as training data to a machine learning model. Because the machine learning model is trained on x-ray data taking into account abnormalities seen by a medical professional on the MRI or CT images of the same patient, it can be trained to detect subtle features that would not normally be detected by a human radiologist based solely on the x-ray images. In different embodiments, the training data may be complied with or without a medical professional's input. After training, a new set of x-ray images can be processed by the machine learning model, where the machine learning model is able to detect subtle features in the x-ray images. The subtle features may only be detected by a radiologist using higher detail images. In other instances, the machine learning model is able to detect subtle features in the x-ray images that would not be detected by a radiologist even when using higher detailed images. In some embodiments, a series of x-ray images are processed to view and/or predict a condition over time. For example, the series of images may be trained to detect a condition by comparing features in a current x-ray with features in a previous x-ray to track a change indicative of a condition. In some of these embodiments, the machine learning model is trained on a series of MRI images with paired x-ray images.

In some embodiments described herein, the machine learning model is able to identify both obvious features as well as the subtle features in the images. In some embodiments described herein, the output identifies the location of the feature in the x-ray images, as well as a probability that the feature is associated with a given condition (e.g., "95%" probability that the feature is indicative of bone-on-bone contact).

In some embodiments, the training data further identifies whether features are acute (developed suddenly), chronic (developed over an extended period of time), or subacute (between acute and chronic) and the machine learning model is trained to predict whether the features are acute, chronic, or subacute.

In some embodiments, the x-ray imaging can also be used to image the abdomen and chest of patients. The machine learning model can be trained to identify abnormalities in the abdomen and chest (including structures such as tumors, vessels, and fractures). Traditionally such structures are imaged using CT machine, but the same process discussed in this paper can be used to identify abnormalities in the abdomen and chest using x-ray images captured with an x-ray machine.

In some embodiments, the disclosure herein, results in more accurate diagnoses predictions and often new diagnosis that otherwise would not be made on an x-ray. This ultimately results in an improvement in patient care by identifying new diagnosis that may not be made or delayed, and therefore expediting appropriate care, eliminating unnecessary or inappropriate care resulting in improved health care and decreased cost of the care. In some embodiments, the embodiments disclosed herein include improved machine learning techniques that results in a machine learning model that can identify conditions that previous modeling techniques would not detect. For example, the machine learning model may be able to identify subtle fractures in bones or soft tissue injuries that would typically not be identified (or even attempted to be identified) in an x-ray image. For example, pervious modeling techniques input training data which is identified from the same type of medical image. Accordingly, these modeling techniques do not include accurate labels for conditions that are normally only captured in higher detailed images and the machine learning model is not trained to identify these conditions.

In many embodiments, the predicted diagnosis is provided to a radiologist user to analyze the results. In some embodiments other physicians are given the results to interpret the diagnosis prediction. For example, an emergency room physician, urgent care physician, spine surgeon, etc. may be given the new diagnoses to guide them in providing appropriate care. In some embodiment, users access the diagnosis system as part of a subscription service.

In some embodiments, the machine learning model detects occult conditions. Occult conditions include radiographically occult conditions including conditions that are not visible or not easily visible on an x-ray image. In some embodiments, these conditions are ones that are easily identifiable on one of or both of an MRI image and CT image but occult on an x-ray image of the same region.

FIG. 1 illustrates an example environment 100 for a diagnosis system. The environment includes a diagnosis system 102 in digital communication (via a network 140) with a medical image data storage system 106, an electronic medical records (EMR) system 114, an insurance provider system 116, and a medical imaging machine 117.

The diagnosis system 102 operates a diagnosis predictor 104. In the example shown the diagnosis predictor includes a machine learning model 130 which is trained using the training process 124. The diagnosis system 102 is further configured to communicate with various computing devices including the radiologist computing device 118 operated by a radiologist user, a physician computing device 120 operated by a physician user, and the patient computing device 122 operated by a patient user.

In some embodiments, the diagnosis system 102 is a computing system comprising one or more computing devices (e.g., servers). In some embodiments, the diagnosis system 102 is built in a cloud computing environment. In some embodiments, the diagnosis system is a user computing device, such as the physician computing device 120 and the diagnosis predictor is configured to be executed locally on the user computing device. In some embodiments, the diagnosis system 102 communicates with the various systems and computing devices over a public and/or private network (e.g., the network 140). An example of a public network includes the Internet.

In some embodiments, the radiologist directly interfaces (e.g., over the network 140) with the EMR system 114 and/or the insurance provider system 116 from the radiologist computing device 118. For example, the radiologist may confirm a predicted diagnosis before sending the diagnosis to the EMR system 114 and enter the billing code with an interface with the insurance provider system 116. Similarly, the physician user may directly interface (e.g., over the network 140) with the EMR system 114 and/or the insurance provider system 116 from the physician computing device 120 over the network 140.

The diagnosis predictor 104 predicts one or more conditions present in a medical image. In typical embodiments, the diagnosis predictor 104 processes an x-ray image to generate a diagnosis prediction. In some embodiments, processing the x-ray image includes detecting features in an x-ray image that are indicative of one or more conditions and making a diagnosis prediction related to the one or more conditions. In some embodiments, the features are abnormalities (sometimes referred to as pathologies) that are typically detected by a specialist viewing the higher detailed image. In some embodiments, the diagnosis prediction includes a predicted likelihood that a predicted condition exists. In some embodiments, the medical image is retrieved directly from the medical imaging machine 117. In other embodiments, the medical image is retrieved from a datastore in communication with the medical imaging machine 117.

In some embodiments, the diagnosis predictor 104 includes a machine learning model (e.g., the machine learning model 130), which is trained using the training process 124. The training model includes inputting x-rays that are annotated as having abnormalities or are labeled as having no abnormalities with these inputs providing the ground truth for the machine learning algorithms.

The medical image data storage system 106 stores a plurality of medical images typically from more than one different types of scans. In the example shown the medical image data storage system 106 stores x-ray images 108, MRI images 110, and CT images 112. In some embodiments, the medical image data storage system 106 includes, is integrated with, or is a Picture archiving and communication system (PACS).

The training process 124 is performed to train the machine learning model 130. The training process 124 begins with retrieving x-ray training images 126. In some embodiments, the x-ray training images 126 are retrieved from the medical image data storage system 106. In some embodiments, the diagnosis system, 102 sends a query to the medical image data storage system 106 to retrieve x-ray training images 126 with paired higher detailed images (e.g., one of or both MRI images and CT images). Annotations are made to the x-ray training images 126 for features identified in the paired higher detailed images. Machine learning model 130 is then trained to identify these features in the x-ray images and output these predicted features. In some embodiments, the training process is iterated including training iterations where the annotations are provided to train the machine learning model and validation interactions where the annotations are not provided to the machine learning model 130 and the predicted outputs are compared to the annotations. In some of these embodiments, the training examples are split into a training group and a validation group. In some embodiments, the predicted features are indicative of one or more medical conditions. A variety of artificial intelligence algorithms and technologies can be used to train the machine learning model 130. Example method for the training process 124 are illustrated and described in reference to FIGS. 2 and 3.

The EMR system 114 is system which manages medical records for a plurality of patients. The EMR system 114 stores medical history information for each patient which can be accessible to verified systems. In some embodiments, the diagnosis system 102 retrieves patient information from the EMR system 114 and/or provides predicted diagnosis to the EMR system 114. In some embodiments, the EMR data is provided to the radiologist user or the physician user who analyzed the predicted results alongside the EMR data for the patient user.

The insurance provider system 116 is computing system for an insurance provider. In some embodiments, the diagnosis system 102 interfaces with the insurance provider system 116 to provide billing codes. In some embodiments, the insurance provider may provide incentives for detecting certain conditions with an x-ray image that would typically only be detected in higher detailed images. In some embodiments, the diagnosis system interface with the EMR system using predefined billing codes.

The medical imaging machine 117 is a machine which is used to take a scan and process the scan to make a medical image. In typical embodiments, the medical imaging machine 117 is an x-ray machine.

Figure 2:
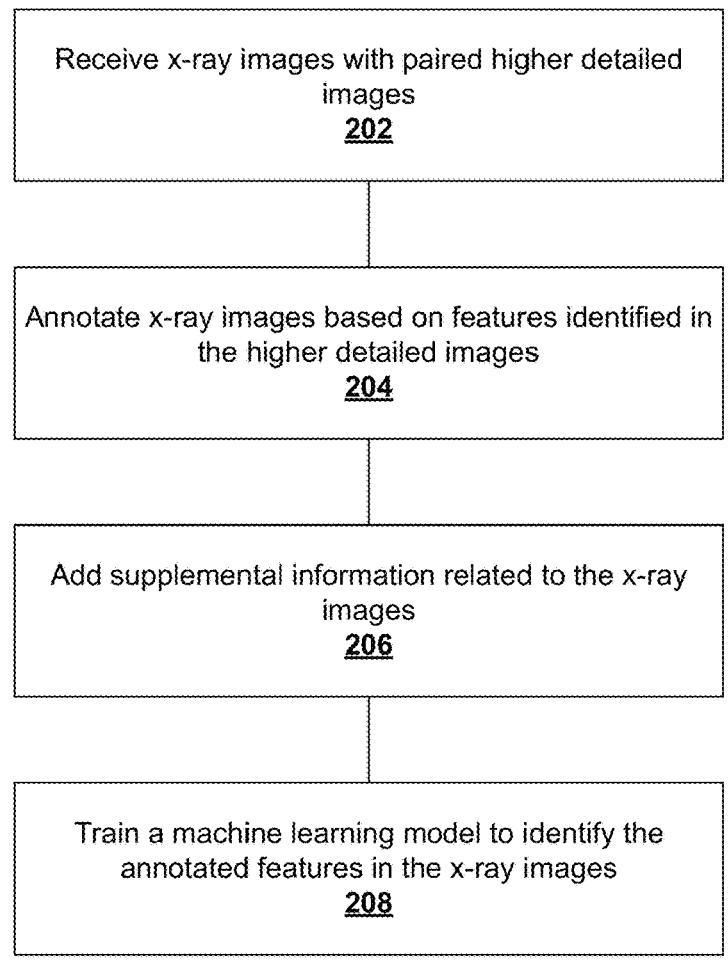
FIG. 2 illustrates an example method for training a machine learning model to identify features in an x-ray image that are indicative of one or more conditions, in accordance with some embodiments of the present disclosure.

FIG. 2 illustrates an example method 200 for training a machine learning model to identify features in an x-ray image that are indicative of one or more conditions. The method includes the operations 202, 204, 206, and 208.

The operation 202 receives x-ray images with paired higher detailed images. In some embodiments, the paired higher detailed images are images received from a CT or MRI scan. In some embodiments, a query request is sent to a database to retrieve paired images based on a criteria, the criteria including the images being from the same patient, of the same region, and taken within a predetermined time range (e.g., day, two days, week, two weeks, month, etc.).

The operation 204 annotates x-ray images based on features identified in the higher detailed images. In some embodiments, the annotations are manually made by a radiologist or other specialist. In some embodiments, the radiologist annotates the x-ray images from features in the higher detailed image using the annotator user interface 600, illustrated and described in reference to FIG. 6.

The operation 206 adds supplemental information related to the x-ray images. In some embodiments, the operation 206. In some embodiments, the supplemental information includes patient medical information provided by a radiologist user, other physician user, and or the patient. In some embodiments, the supplemental information includes patient information retrieved from an EMR system (e.g., the EMR system 114 shown in FIG. 1). For example, if a patient recently had a certain injury, it may impact the likelihood of an anterior cruciate ligament tear, which can be determined by the machine learning model. Other information can also be compiled including information related to the machines used to scan the medical images. In some embodiments, some or all of the supplemental information (such as, EMR record data or physician notes) is processed using natural language processing to identify relevant information for the machine learning model.

The operation 208 trains a machine learning model to identify the annotated features in the x-ray images. In some embodiments, the machine learning model is trained to make a diagnosis prediction with explanative confidence metrics. In some embodiments, the model provides a confidence score for the predicted diagnosis. In some embodiments, the machine learning model uses a similar techniques as used in natural language processing to process the image. In some embodiments a vision transformer is used (e.g., by looking at a first region of pixels, then a second region of pixels, and deriving features from the sequence of features detected in each region). For example, transferring the learning from the first region to the second region and vice versa until the entire image is analyzed. In some embodiments, the machine learning model is a convolutional neural network (CNN). In some embodiments, the CNN model combines information from different local regions of the image and from different parts of the images in a hierarchical fashion. For example, the model may analyze a part of the bone, a region next to the bone, and then combine the information to detect features. In typical embodiments, the machine learning model is trained using a supervised learning technique with specific annotations provided to specific regions. In some embodiments, only a general diagnosis annotation is provided and the machine learning algorithm learns to detect which region in the image contains the feature (e.g., abnormality) indicative of one or more conditions.

In some embodiments, multiple processing techniques are applied to the x-ray image and the predictions are ensembled to more accurately detect features or make predictions. For example, an ensemble learning algorithm can be used. In some embodiments, using multiple processing techniques eliminates noise from the predictions.

Figure 3:
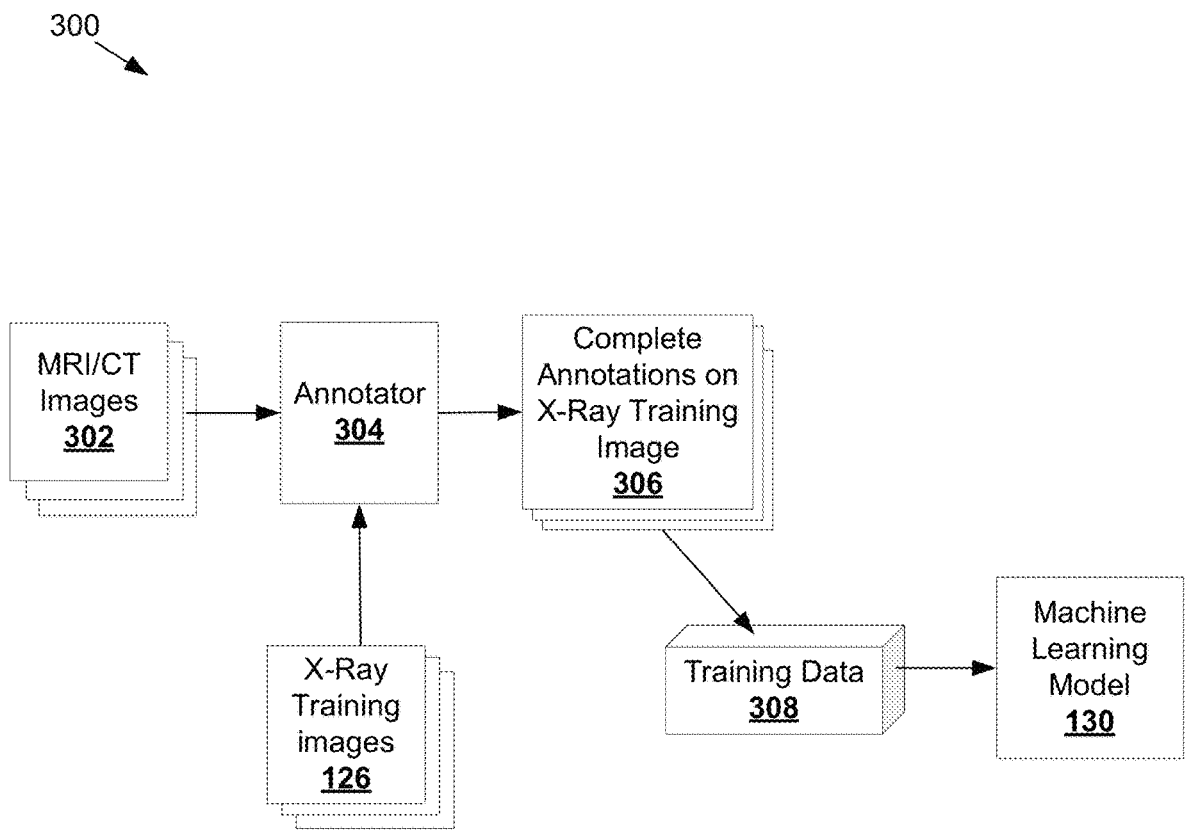
FIG. 3 illustrates a system-flow diagram for an example method for training a machine learning model to identify features in an x-ray image that are indicative of one or more conditions, in accordance with some embodiments of the present disclosure.

FIG. 3 illustrates a system-flow diagram for an example method 300 for training a machine learning model to identify features in an x-ray image that are indicative of one or more conditions. FIG. 3 is another example of the training process 124 illustrated and described in FIG. 1.

The training data 308 is compiled from the x-ray training images 126 and the complete annotations 306. The complete annotations 306 includes features identified in the MRI/CT images 302 by the annotator 304. The MRI/CT images 302 are paired with the x-ray training images 126. In some embodiments, the annotator 304 is performed with a radiologist (or other specialist) interacting with an annotator user interface. For example, the example annotator user interface 600 illustrated and described in reference to FIG. 6. In other embodiments, the annotator 304 includes an algorithm for automatically detecting features in the paired MRI/CT images 302 to compile the complete annotations 306.

The machine learning model 130 is trained using the training data 308. The machine learning model 130 model is trained to identify features on the x-ray image, including subtle features that would typically not be detected in x-ray images but instead detected in the MRI/CT images. The operation 208 illustrated and described in reference to FIG. 2 is an example operation for training the machine learning model 130.

In some embodiments, the training data is split up into training examples and test examples. Where the model is first trained on training examples with the annotations presented and then tested with the test examples having the annotations hidden. If the machine learning model predicts the annotations on the test examples at an accuracy level higher than a threshold, then the training is complete, otherwise the training continues on a broader training set. In some embodiments, the machine learning model is continually updated in real time or periodically as more medical images and annotations are provided. In some embodiments, the machine learning model is further refined based on feedback from physician users (e.g., radiologist confirming or rejecting diagnoses). For example, a physician user may confirm or reject a diagnosis, where this feedback is provided to the machine learning model to further train the model based on the positive or negative feedback.

Figure 4:
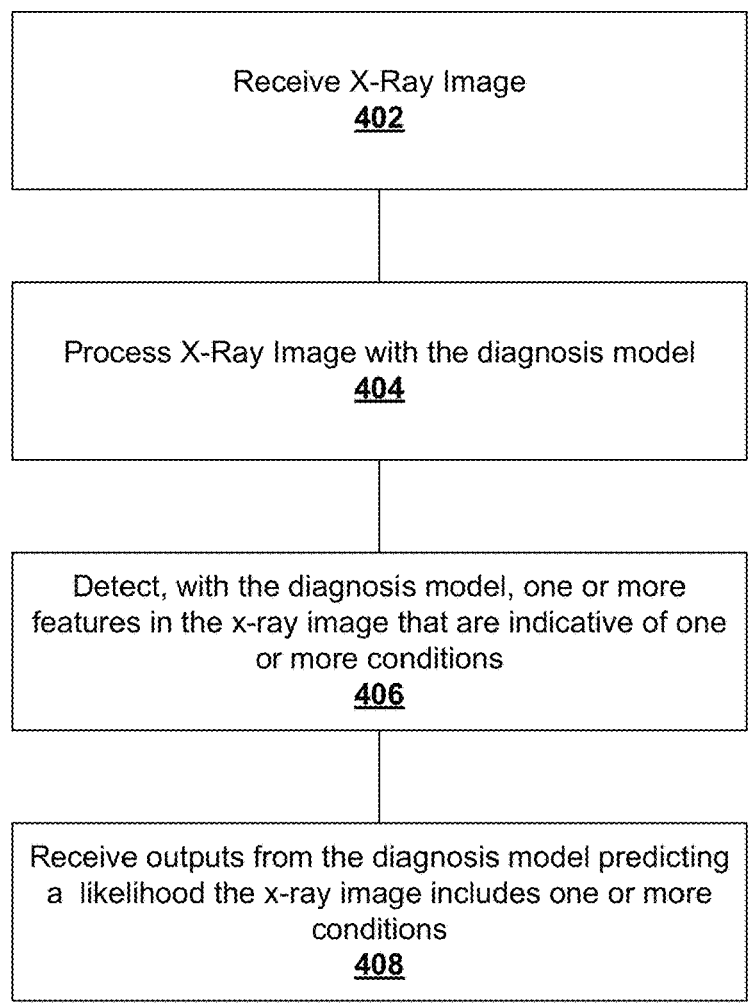
FIG. 4 illustrates an example method for detecting one or more features in an x-ray image that are indicative of one or more conditions, in accordance with some embodiments of the present disclosure.

FIG. 4 illustrates an example method for detecting one or more features in an x-ray image that are indicative of one or more conditions. In some embodiments, the method 400 is performed on the diagnosis system 102, illustrated and described in reference to FIG. 1. The method 400 includes the operation 402, 404, and 406.

The operation 402 receives an x-ray image. In some embodiments, the x-ray image is retrieved from a database along with other information related to the patient. In some embodiments, the x-ray image is directly uploaded from an x-ray machine. In some embodiments, notes from the physician or radiologist which took or requested the scan are also received. In many embodiments the x-ray image is retrieved from a picture archiving and communication system (PACS), which a radiologist uses to diagnosis a plurality of patients.

The operation 404 processes the x-ray image with the diagnosis model. In some embodiments, processing the x-ray image includes detecting features in the x-ray image (e.g., using one or more machine vision algorithms) that are indicative of one or more conditions at the operation 406. In some embodiments, the diagnosis model further analyzes other patient data including medical history (e.g., retrieved form an EMR system), notes provided by a physician and/or radiologist, x-ray machine data including image metadata, etc.

As discussed above, the operation 406 detects, with the diagnosis model, one or more features in the x-ray image that are indicative of one or more conditions. In some embodiments, these include conditions which would typically not be detected by a human radiologist reviewing the x-ray image or a condition which is normally not even attempted to be discovered in an x-ray image. In some embodiments, the predicted diagnosis is provided to an insurance provider (e.g. the insurance provider system 116) for billing purposes.

The operation 408 receives outputs from the diagnosis model predicting a likelihood the x-ray image includes one or more conditions. In some embodiments, the likelihood corresponds to a percentage probability that the condition exists. In some embodiments, the output is provided to a physician user and/or radiologist user to confirm or reject the diagnosis prediction.

Example applications of the diagnosis model include: (1) identifying fractures in all the bones throughout body including: A) displaced, non-displaced and avulsion fractures, B) occult (not readily visible) and non-occult fractures, C) stress/insufficiency fractures, as well as determining the age (acute, subacute and chronic) of fractures; (2) identifying bone lesions including avascular necrosis and tumors; (3) identifying degrees of arthritis including assessing degrees of cartilage loss/chondromalacia in joints; (4). identifying tendon and ligament injuries throughout the body including the degrees of the injuries. Examples would include cruciate ligament (ACL and PCL), collateral ligament (medial and lateral), and tendon (quadriceps and patella) injuries in the knee. (Of note is that these are almost never identified or visualized on x rays); (5) identifying soft tissue injuries including hematomas, soft tissue contusions, infection, and swelling. (Of note is that these are almost never identified or visualized on x-rays); (6) identifying size and degree of fluid in joints; (7) identifying abnormalities in the abdomen and pelvis including, for example, masses (such as kidney, liver and spleen) and degrees of free fluid; and (8) identifying abnormalities in the chest including, for example, pneumothorax, mediastinal/hilar/pleural and lung lesions.

Figure 5:
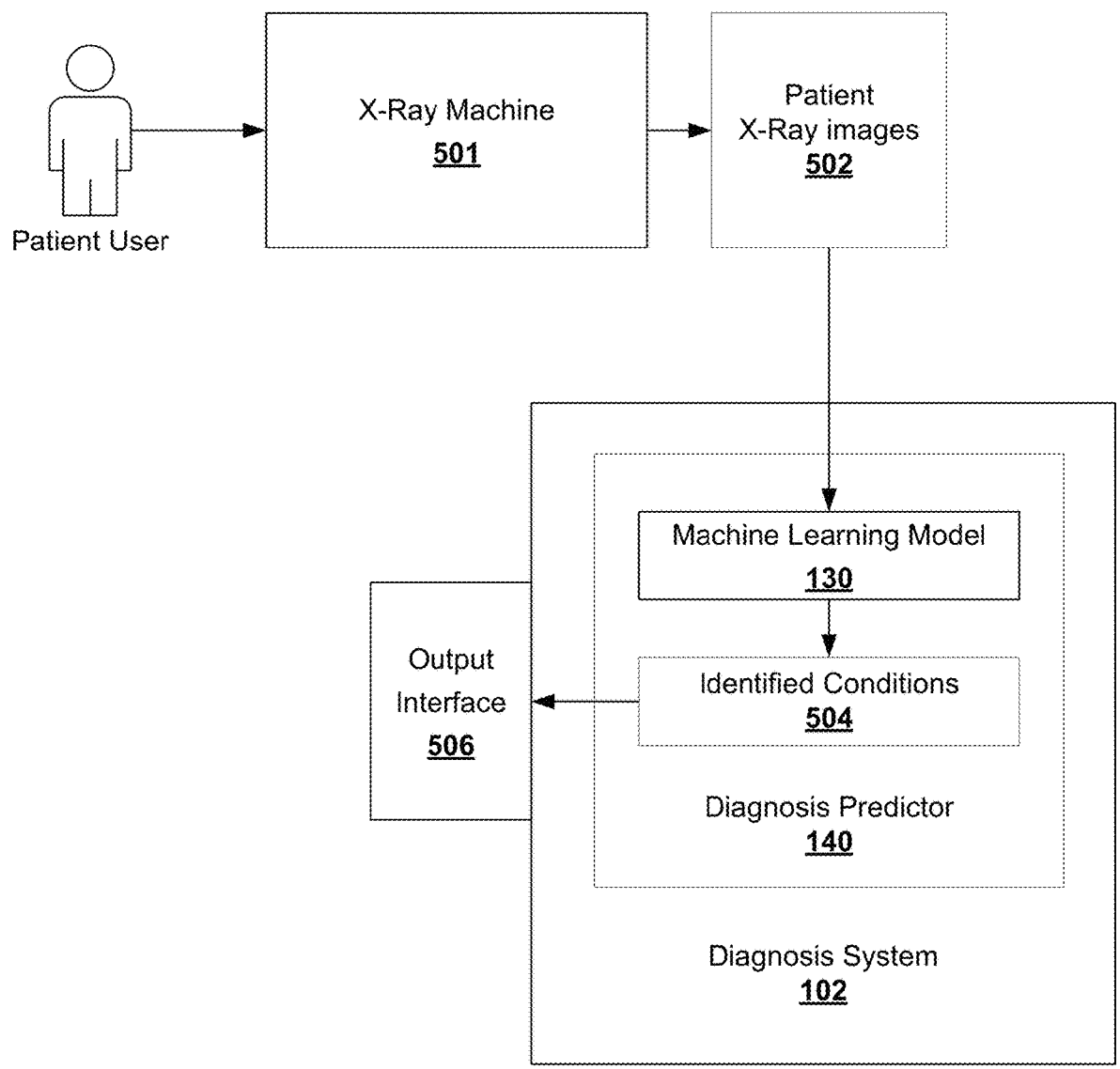
FIG. 5 illustrates a system flow diagram for an example method for detecting one or more features in an x-ray image that are indicative of one or more conditions, in accordance with some embodiments of the present disclosure.

FIG. 5 illustrates a system flow diagram for an example method for detecting one or more features in an x-ray image that are indicative of one or more conditions. In the system flow diagram shown, the patient user receives an x-ray scan at the x-ray machine 501. The x-ray machine 501 outputs one or more patient x-ray images 502. The one or more patient x-ray images 502 are provided to the diagnosis system 102. For example, the patient x-ray images 502 can be electronically communicated to the diagnosis system over public or private network.

The diagnosis system 102 receives the patient x-ray images 502 directly or indirectly from the x-ray machine. The diagnosis system processes each of the received x-ray images with the machine learning model 130. In some embodiments, only a single patient x-ray image is processed. In other examples, multiple patient x-ray images may be processed. In some of these embodiments, the multiple patient x-ray images are processed together to detect features derived from multiple images. In other examples, the multiple patient x-ray images are processed serially (e.g., one after another). Some examples include combinations thereof.

The machine learning model 130 is trained using annotated and unannotated x-ray images to detect one or more features in the x-ray image that are indicative of one or more conditions, where the annotated x-ray images include annotations based on features identified in paired higher detail images. The machine learning model 130 outputs one or more identified conditions. In some embodiments, each of the identified conditions includes a probability that the identified conditions exist. The identified conditions 504 are accessible by one or more computing devices via an output interface 506. In some embodiments, the output interface 506 includes an API which allows different applications to access information related to the patient or the identified conditions. These APIs include processes to verify the user or system has permission before providing access.

Figure 6:
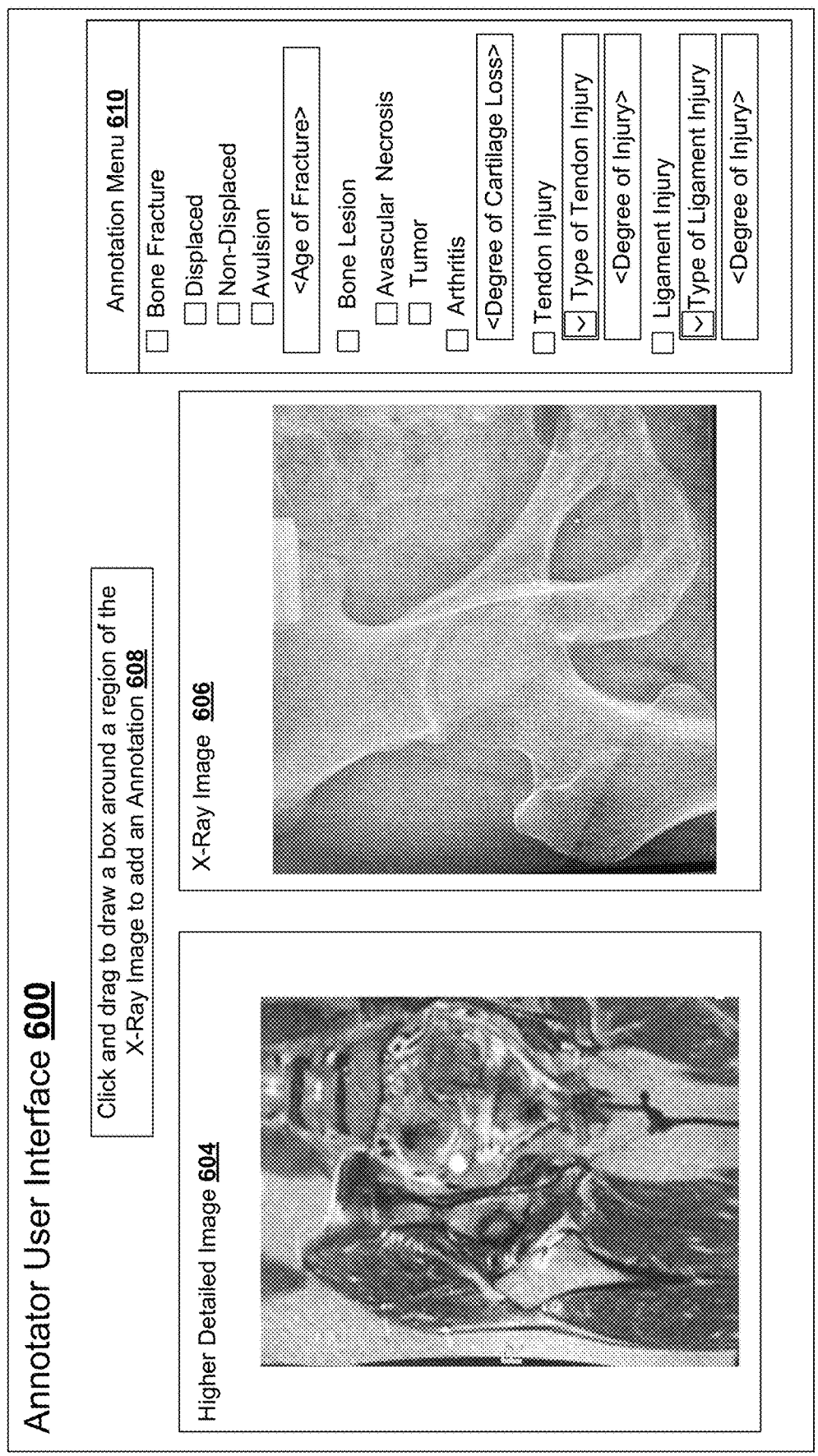
FIG. 6 illustrates an example annotator user interface, in accordance with some embodiments of the present disclosure.

FIG. 6 illustrates an example annotator user interface 600. The annotator image includes a higher detailed image panel 604 displaying a higher detailed medical image (in the example shown an MRI image), an x-ray image panel 608 displaying an x-ray image. The annotator user interface also includes an annotation menu 610 displaying a plurality of annotations.

In some embodiments, the x-ray image is selectable to select a specific region of the x-ray image to annotate. In some embodiments, a visual element (e.g., an unfilled box) is displayed overlaying the region. The region selected is then associated with an annotation selected from the annotation menu 610. For example, a user can click and drag a box to select a region then select one or more conditions on the annotation menu 610 which are then associated with that region of the x-ray image. In some embodiments, the user selects the region on the higher detailed image and the region is automatically selected and captured on the x-ray image at the same or similar coordinates.

The annotation menu 610 can include various input elements for adding annotations. These input elements can include input text fields, selection boxes, radio selectors, drop down menus etc.

In some embodiments, the annotator user interface 600 is displayed on a computing device of an annotator user. For example, on the radiologist computing device 118 to allow the radiologist user to annotate a plurality of x-ray images.

Figure 7:
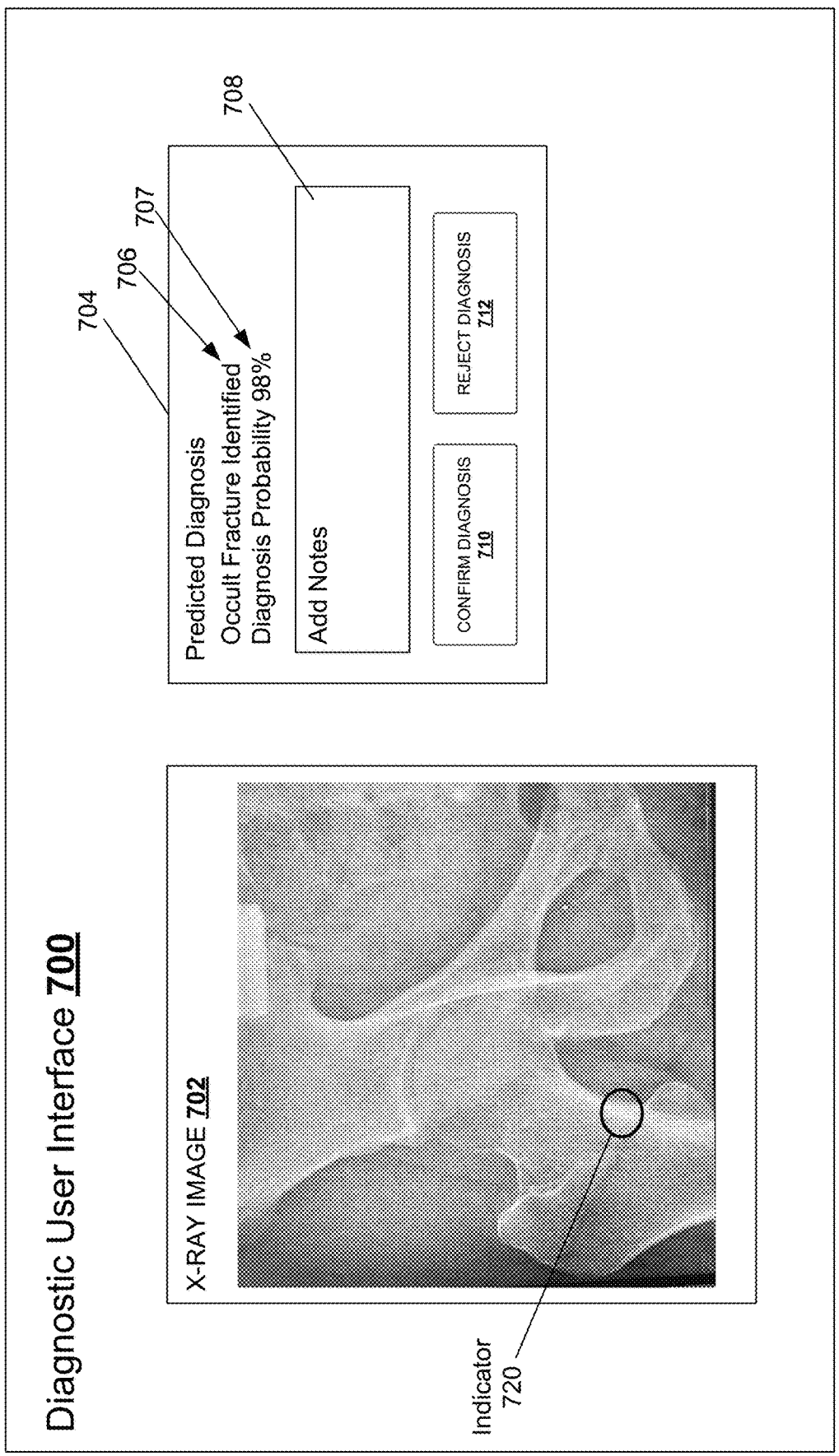
FIG. 7 illustrates an example diagnostic user interface, in accordance with some embodiments of the present disclosure.

FIG. 7 illustrates an example diagnostic user interface 700. The example diagnostic user interface includes an x-ray image display panel 702 for displaying an x-ray image and a diagnosis prediction panel 704 displaying a diagnosis prediction. The diagnosis prediction includes a predicted diagnosis and a diagnosis probability. In some embodiments, the diagnosis prediction panel 704 includes an add notes interface 708 where a physician or radiologist can add notes to the predicted diagnosis. The diagnosis prediction panel 704 also includes a confirm diagnosis button 710 and a reject diagnosis button 712. The user (typically a radiologist or physician) can confirm the diagnosis by selecting the confirm diagnosis button 710 or rejection the diagnosis by selecting the reject diagnosis button 712. In some embodiments, the x-ray image, the notes added in the add notes interface 708 and the selection of one of the confirm diagnosis or reject diagnosis buttons are used as further training data for the machine learning model. In some embodiments, when a user selects the reject diagnosis button, the system recommends the patient receive a different scan using a higher detailed medical imaging process. In some of these embodiments, the images from the different scan are automatically paired with the x-ray image.

In some embodiments, one or more visual elements (arrow, box, circle, highlight, or heat map) overlay the x-ray image to indicate areas where one or more features were detected, where the features that were detected are indicative of the predicted condition 706 and the diagnosis probability 707. In some embodiments, automatically generated annotations are presented with visual connectors to locations in the x-ray image.

In some embodiments, the diagnostic user interface 700 is presented on the radiologist computing device 118 to a radiologist user or on the physician computing device 120 to the physician user. In some embodiments, a slightly modified version of the diagnostic user interface 700 is presented on the patient computing device 122 to the patient user. For example, diagnosis prediction panel 704 may not include the add notes interface 708, the confirm diagnosis button 710, or the reject diagnosis button 712. In many examples the diagnosis prediction will include an arrow (or other indicator) showing the user where the abnormality was detected.

In some embodiments, the x-ray image includes an indicator 720 which specifically points out the region an abnormality was detected (e.g., a feature which is indicative of a condition). In the embodiment shown, the indicator 720 is a circle. In some embodiments, the indicator 720 can be any of a circle, a heatmap, a highlight, other icon, a label, or any combination thereof. An example of a heatmap is illustrated and described in reference to FIG. 17.

Figure 8:
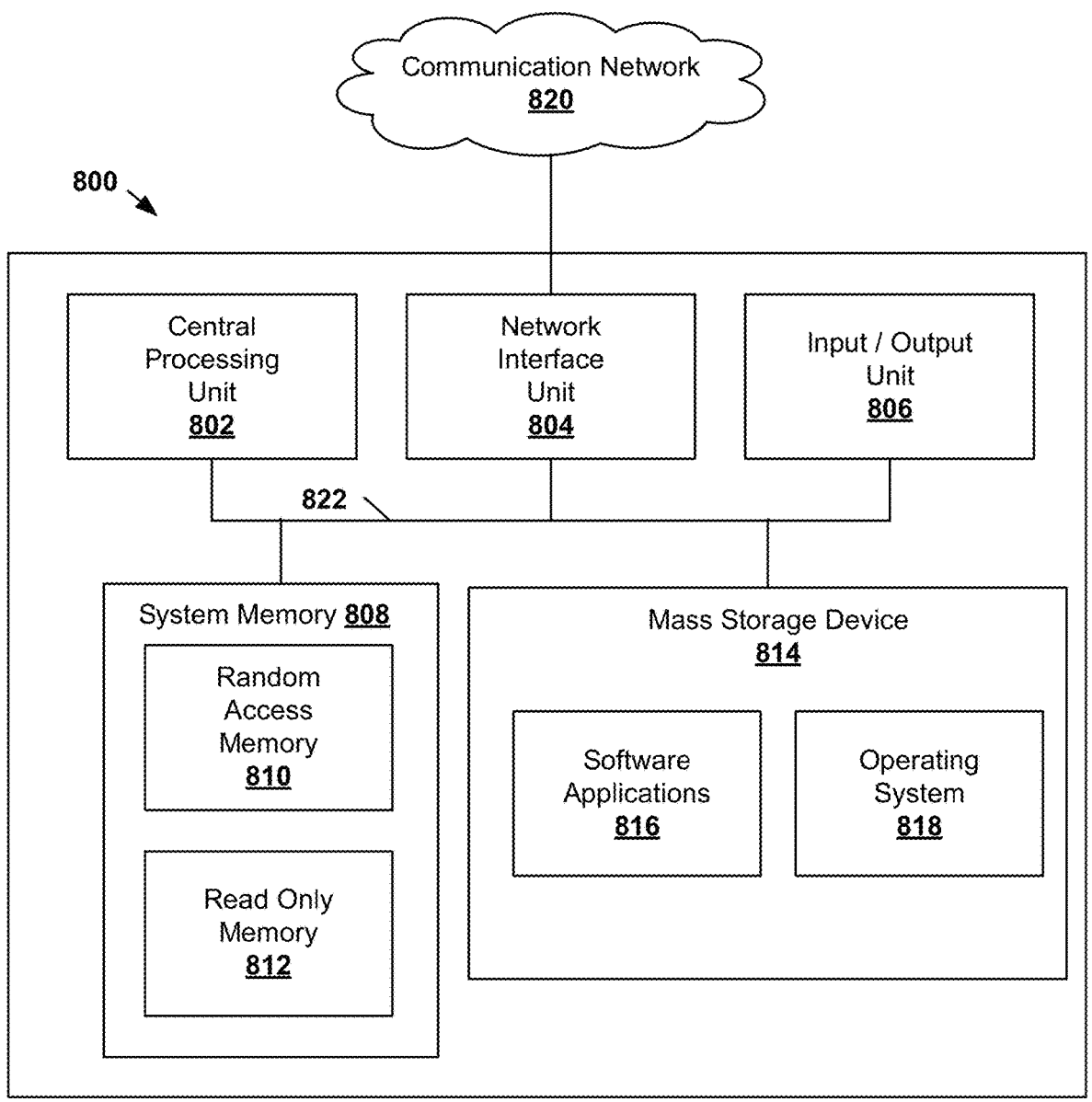
FIG. 8 is a block diagram illustrating an example of the physical components of a computing device, in accordance with some embodiments of the present disclosure.

FIG. 8 is a block diagram illustrating an example of the physical components of a computing device 800. The computing device 800 could be implemented in various aspects of the environment 100, such as the Radiologist Computing device 118, physician computing device 120, and the patient computing device 122 illustrated and described in reference to FIG. 1. Components of the computing device 800 can also be incorporated into other devices and systems described herein, such as the diagnosis system 102, the medical image data storage system 106, the EMR system 114, and the insurance provider system 116.

In the example shown in FIG. 8, the computing device 800 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the computing device 800, such as during startup, is stored in the ROM 812. The computing device 800 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable storage media provide non-volatile, non-transitory data storage for the computing device 800. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 802 can read data and/or instructions. In certain embodiments, the computer-readable storage media comprises entirely non-transitory media.

Computer-readable storage media includes volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 800.

According to various embodiments, the computing device 800 can operate in a networked environment using logical connections to remote network devices through a communication network 820, such as a wireless network, the Internet, or another type of network. The computing device 800 may connect to the communication network 820 through a network interface unit 804 connected to the system bus 822. It should be appreciated that the network interface unit 804 may also be utilized to connect to other types of networks and remote computing systems. The computing device 800 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing device 800 can store software instructions and data. The software instructions include an operating system 818 suitable for controlling the operation of the computing device 800. The mass storage device 814 and/or the RAM 810 also store software instructions, that when executed by the CPU 802, cause the computing device 800 to provide the functionality discussed in this document.

MRI and X-Ray Image Examples

FIGS. 9A-16B illustrate examples of MRI images paired with x-ray images. In some of the examples, the MRI image includes features that would typically be detected only in the MRI image and not the paired x-ray image. Using the diagnosis predictor described herein, these conditions are detectable in the x-ray image without the paired higher detailed image. A person of ordinary skill in the art would appreciate that these examples are non-limiting and that many other conditions may advantageously be detected using the machine learning model disclosed herein.

FIG. 9A illustrates an MRI image 902 of a stress/insufficiency fracture in a right femur at 904. FIG. 9B illustrates an x-ray image 906 of the x-ray occult stress/insufficiency fracture in the right femur shown in FIG. 9A at 908. Specifically, the MRI image of the pelvis/hip shows a stress fracture in the right femur at 904. This fracture is occult (and not easily detectable) on the x-ray image 906. However, given the knowledge of its location at 908 (based on the MRI image 902), the machine learning model is able to identify the fracture on the x-ray image. In some examples, the detection on the x-ray image 906 results in improved management and care of this patient resulting in significant downstream healthcare and economic benefits. For example, the diagnosis on the x-ray by the machine learning model may result in immediate appropriate care and expedited healing, which otherwise would likely be delayed. Additionally, the diagnosis would potentially prevent the fracture from growing which may have resulted in requiring an otherwise avoidable surgery. In some examples, the otherwise avoidable surgery has risks, potential complications and could require extended time for healing and increased costs.

Figure 10B:
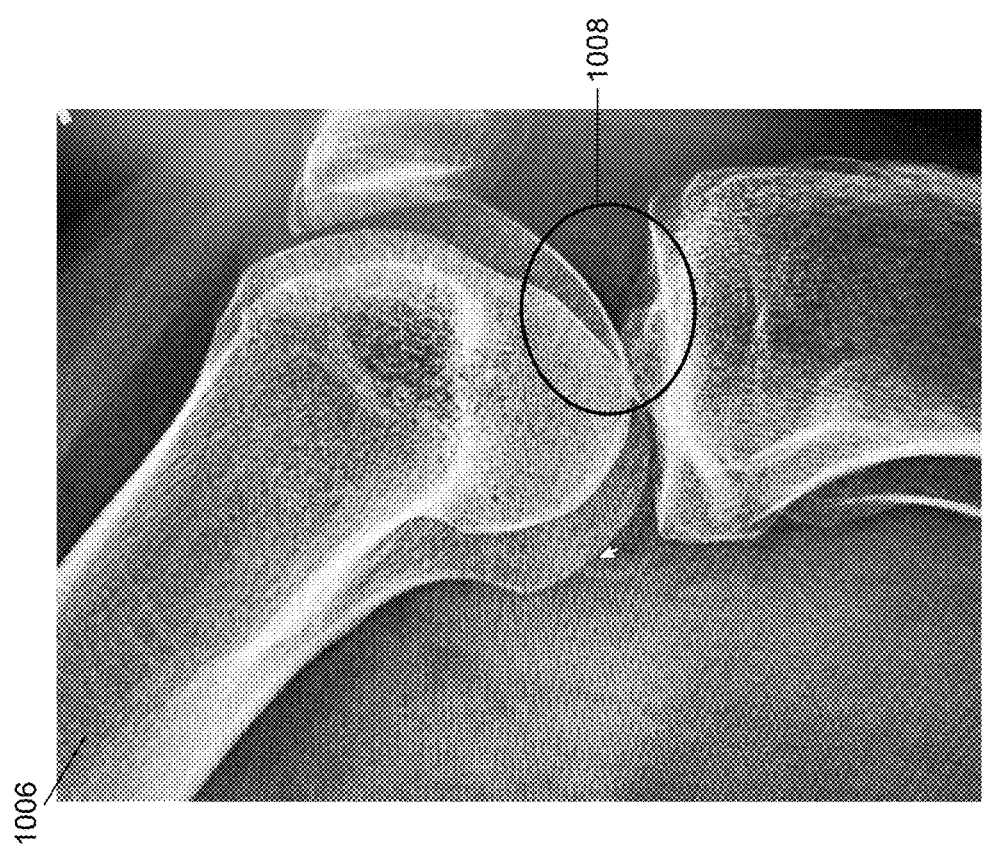
FIG. 10B illustrates an x-ray image of the ACL tear shown in FIG. 10A, in accordance with some embodiments of the present disclosure.
Figure 10A:
FIG. 10A illustrates an MRI image of an anterior cruciate ligament (ACL) tear, in accordance with some embodiments of the present disclosure.

FIG. 10A illustrates an MRI image 1002 of an anterior cruciate ligament (ACL) tear at 1004. FIG. 10B illustrates an x-ray image 1006 of the ACL tear shown in FIG. 10A at 1008. In some examples, the anterior cruciate ligament (ACL) tear is human identifiable on the MRI image 1002. The machine learning algorithm is able to identify the ACL tear on the x-ray image 1006. In some examples, this results in the patient being immediately directed to the appropriate orthopedic surgeon and the patient being immediately appropriately fitted for a hinged brace. In some of these examples, the patient may not require an MRI. In many examples of ACL tears, every day of a delayed diagnosis adds costs to the patients. Accordingly, the machine learning model results in a tangible increase in the percentage of patients correctly diagnosed with an ACL tear, including in situations where an MRI scan may not be immediately available (e.g., in the emergency department).

Figure 11B:
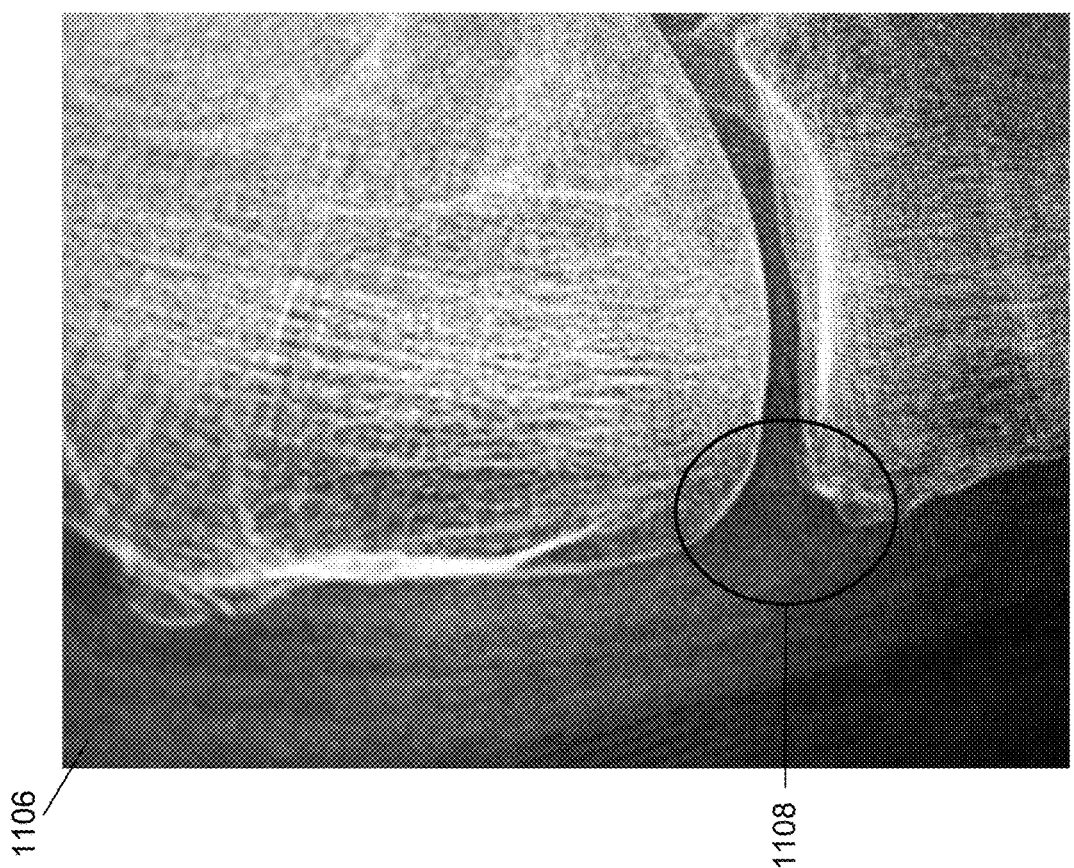
FIG. 11B illustrates an x-ray image of the meniscal tear shown in FIG. 11A, in accordance with some embodiments of the present disclosure.
Figure 11A:
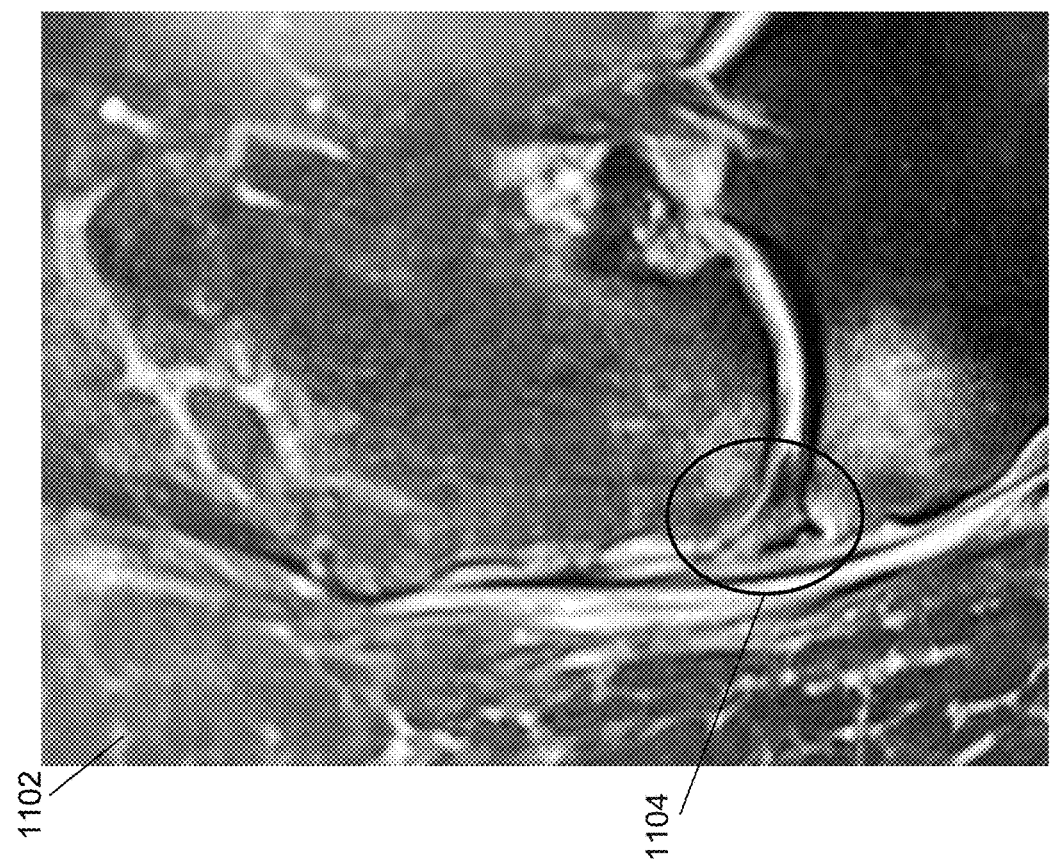
FIG. 11A illustrates an MRI image of a meniscal tear, in accordance with some embodiments of the present disclosure.

FIG. 11A illustrates an MRI image 1102 of a meniscal tear at 1104. FIG. 11B illustrates an x-ray image 1106 of the meniscal tear shown in FIG. 11A at 1108. The MRI image 1102 shows the meniscal tear (tear of the meniscus) which the machine learning model can detect on x-ray. In many typical examples, meniscal tears are not appreciated/diagnosed on x-rays by radiologists.

Figure 12B:
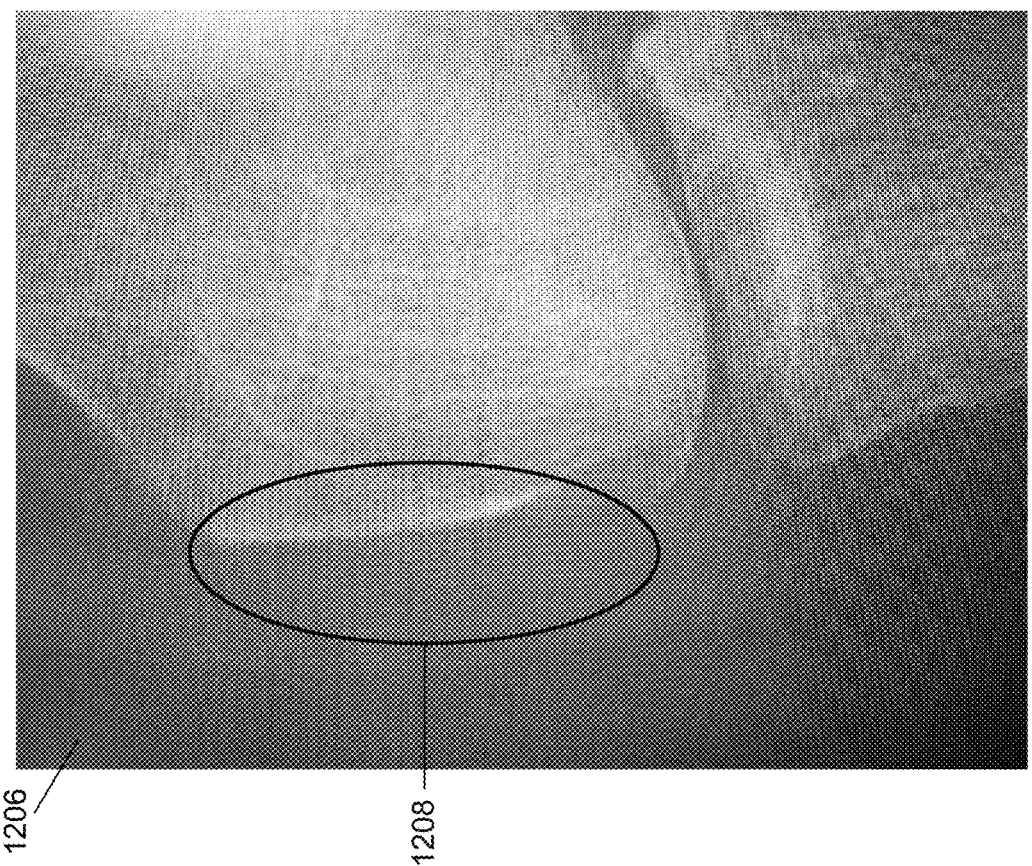
FIG. 12B illustrates an x-ray image of the medial collateral ligament sprain/tear of the knee shown in FIG. 12A, in accordance with some embodiments of the present disclosure.
Figure 12A:
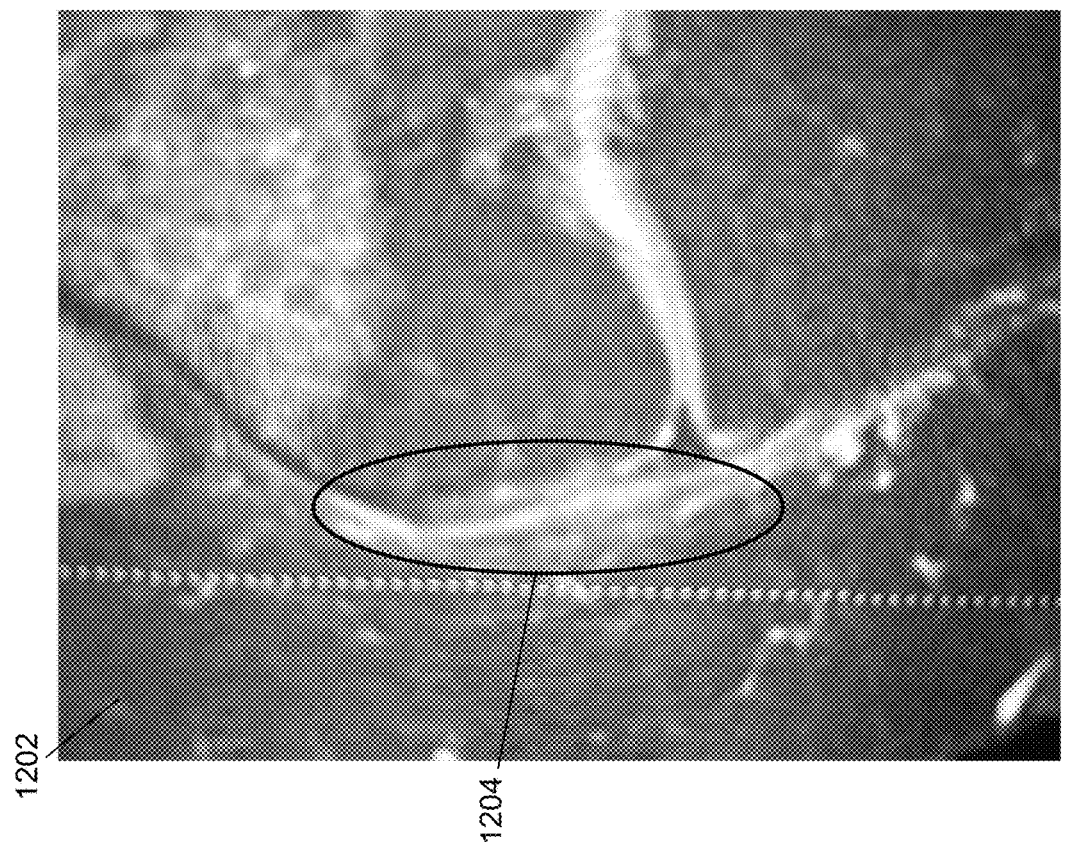
FIG. 12A illustrates an MRI image of a medial collateral ligament sprain/tear of a knee, in accordance with some embodiments of the present disclosure.

FIG. 12A illustrates an MRI image 1202 of a medial collateral ligament sprain/tear of a knee at 1204. FIG. 12B illustrates an x-ray image 1206 of the medial collateral ligament sprain/tear of the knee shown in FIG. 12A at 1208. In some examples, the medial collateral ligament sprain/tear of the knee is identified using the machine learning model on the x-ray image 1106 and would otherwise not be identified on the x-ray by a radiologist, especially given time constraints for reviewing medical images.

Figure 13A:
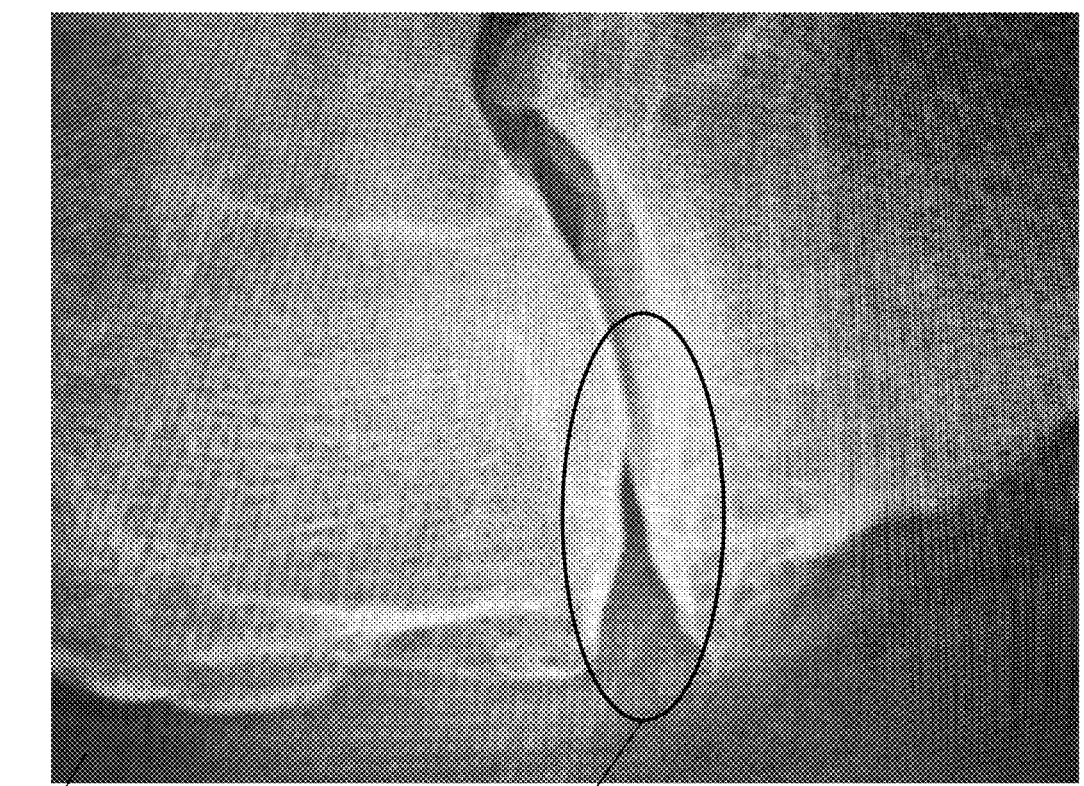
FIG. 13A illustrates an MRI image of a knee with extensive areas of complete loss of cartilage overlying a femur and tibia, in accordance with some embodiments of the present disclosure.
Figure 13B:
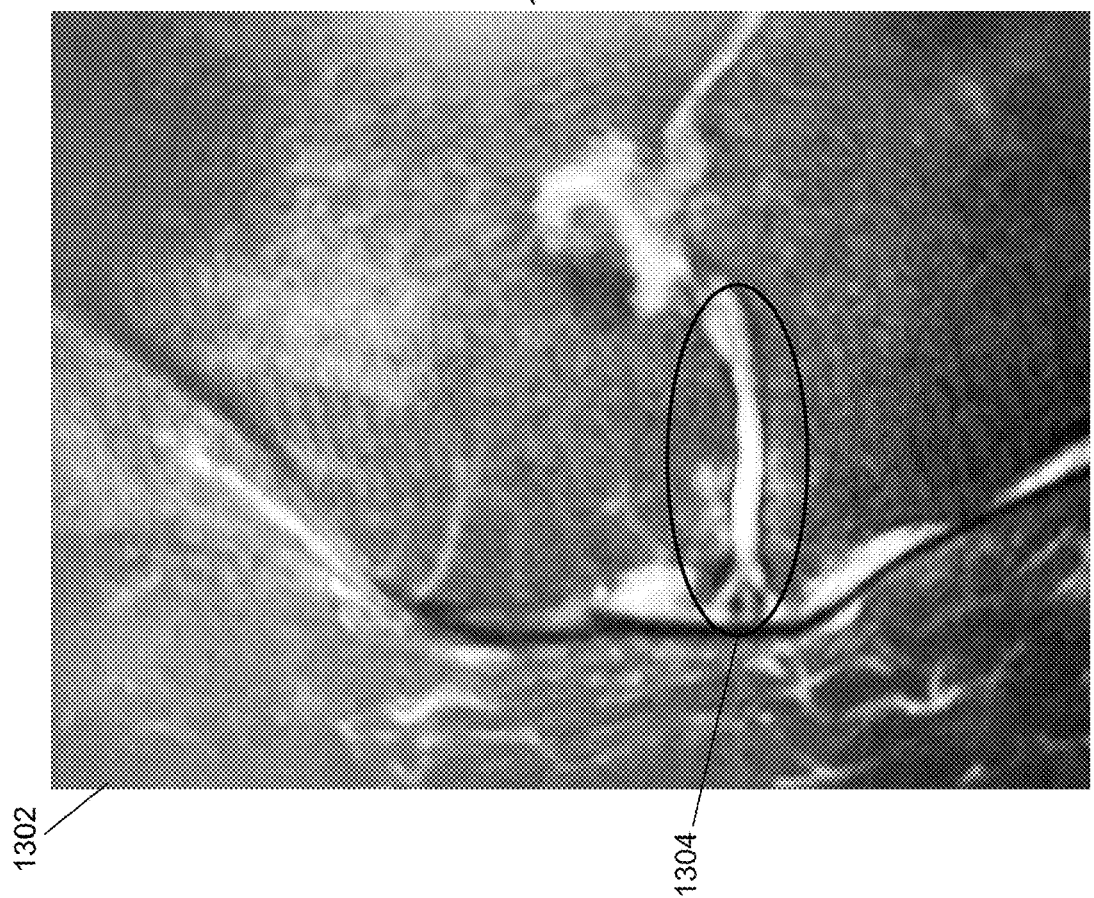
FIG. 13B illustrates an x-ray image of the knee with extensive areas of complete loss of cartilage overlaying the femur and tibia shown in FIG. 13A, in accordance with some embodiments of the present disclosure.

FIG. 13A illustrates an MRI image 1302 of a knee with extensive areas of complete loss of cartilage overlying a femur and tibia at 1304. FIG. 13B illustrates an x-ray image 1306 of the knee with extensive areas of complete loss of cartilage overlaying the femur and tibia shown in FIG. 13A at 1308. In some embodiments, the machine learning model can be trained to detect the cartilage loss in the x-ray image. In some examples, the MRI image 1302 of the knee reveals extensive areas of complete loss of cartilage overlying the femur and tibia resulting in areas of bone on bone. Typically, an x-ray report would likely not comment on the degree of arthritis or not characterize the degrees of cartilage loss as severe. In some embodiments, the machine learning algorithm indicates that the only surgery that would be appropriate would be a knee replacement and, without this x-ray diagnosis, the patient's care would be delayed resulting in continued pain, ineffective care and a likely need for an MRI.

Figure 14B:
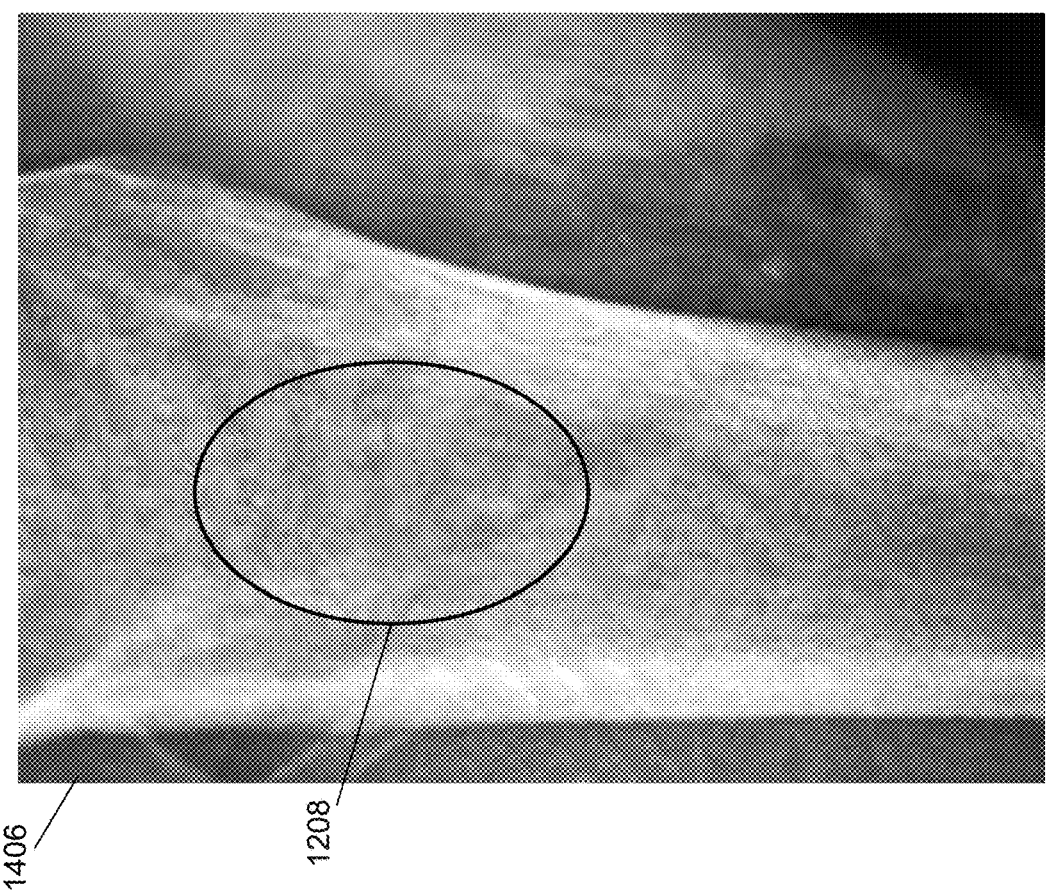
FIG. 14B illustrates an x-ray image of the bone lesion (avascular necrosis) shown in FIG. 14A, in accordance with some embodiments of the present disclosure.
Figure 14A:
FIG. 14A illustrates an MRI image of a bone lesion (avascular necrosis), in accordance with some embodiments of the present disclosure.

FIG. 14A illustrates an MRI image 1402 of a bone lesion (avascular necrosis) at 1404. FIG. 14B illustrates an x-ray image 1406 of the bone lesion shown in FIG. 14A at 1408. The MRI image 1402 shows a bone lesion (avascular necrosis) which highly likely would not be appreciated typically on an x-ray. The machine learning model disclosed herein would be able to identify this lesion altering the patient's care.

Figure 15B:
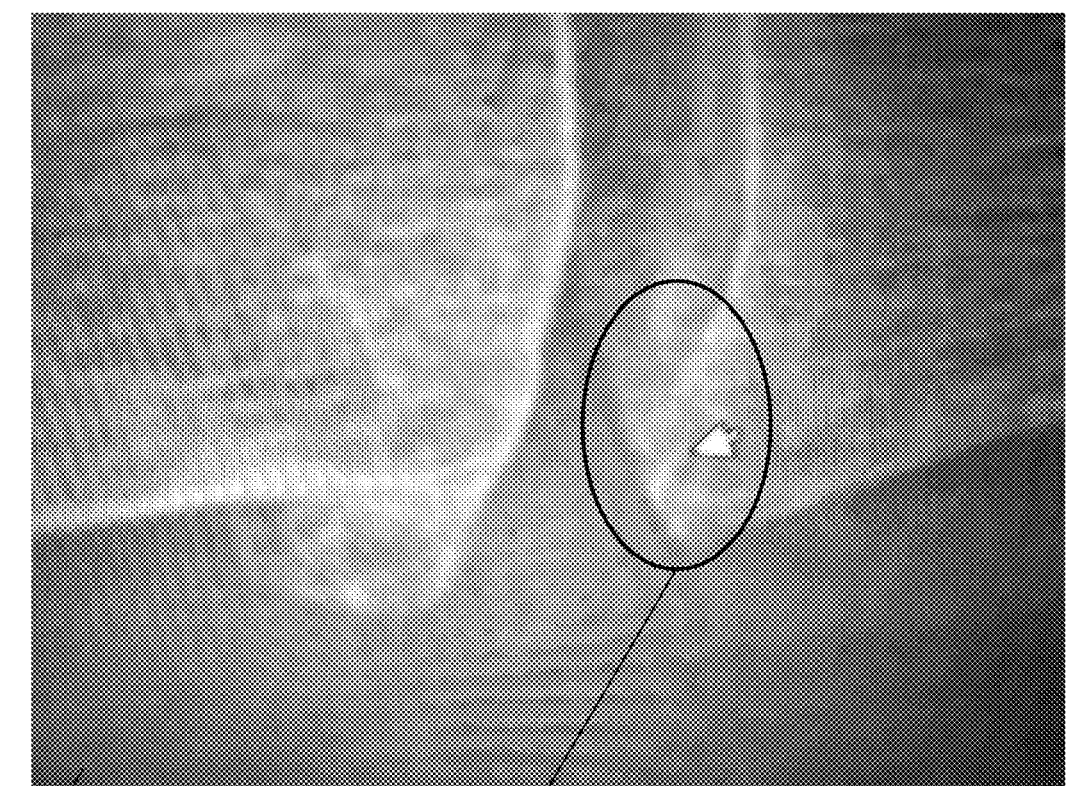
FIG. 15B illustrates an x-ray image of an x-ray occult stress/insufficiency fracture shown in FIG. 15A, in accordance with some embodiments of the present disclosure.
Figure 15A:
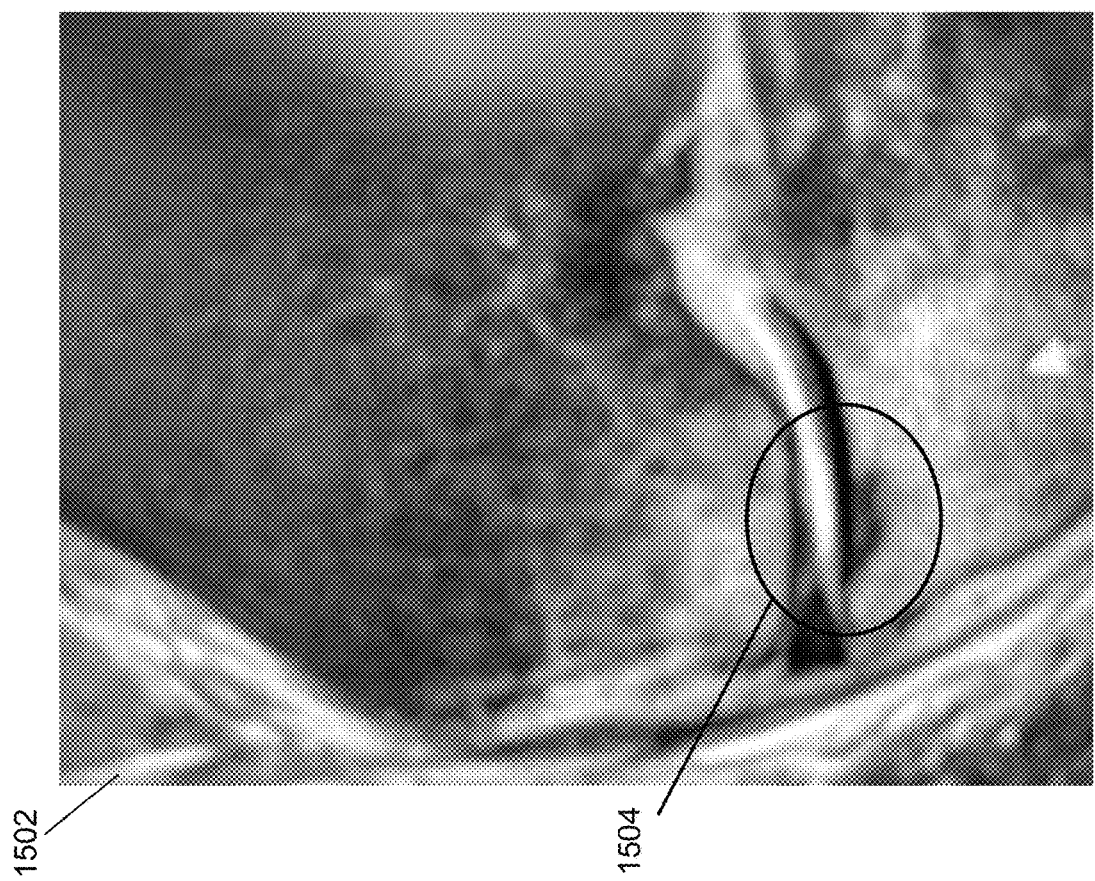
FIG. 15A illustrates an MRI image of a stress/insufficiency fracture, in accordance with some embodiments of the present disclosure.

FIG. 15A illustrates an MRI image 1502 of a stress/insufficiency fracture at 1504. FIG. 15B illustrates an x-ray image 1506 of an x-ray occult stress/insufficiency fracture shown in FIG. 15A at 1506. The MRI image 1502 shows a small insufficiency/stress fracture which is radiographically occult (highly likely not appreciated on the x-ray image 1506). The machine learning model would identify this finding on the x-ray, which would result in immediate treatment with the patient given crutches and limiting the amount of weight-bearing activity resulting in expedited healing and return to normal activity. Early detection by the machine learning model would potentially also avoid the added cost of an eventual MRI.

Figure 16B:
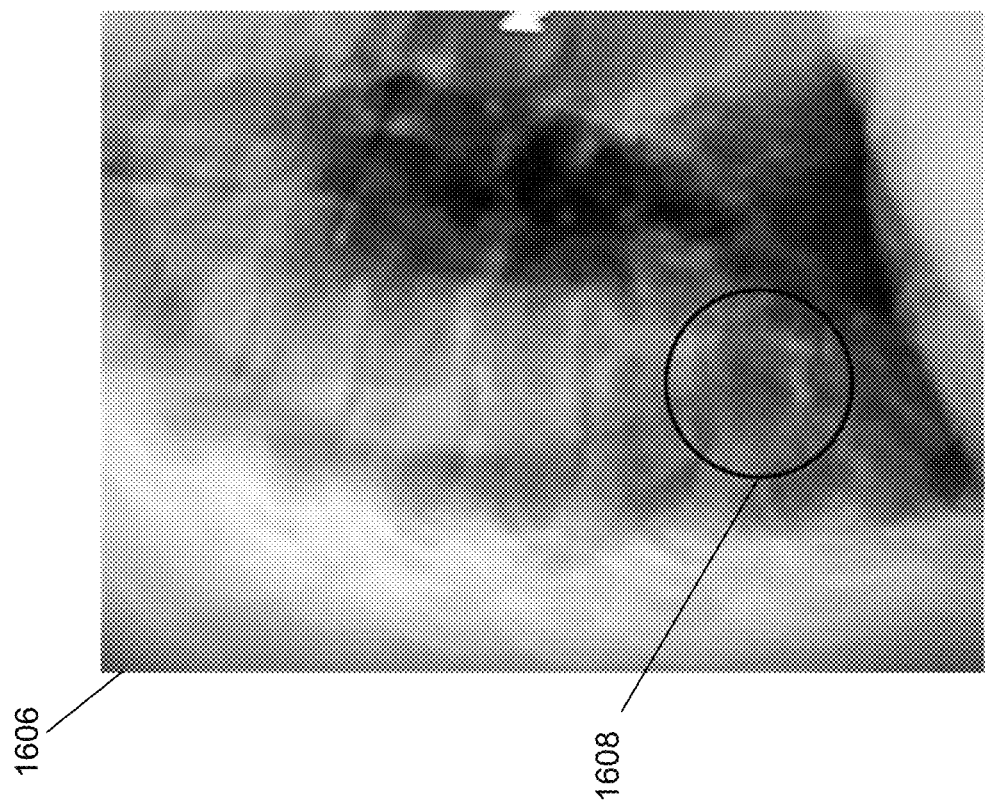
FIG. 16B illustrates an x-ray image of the spine from the patient with metastatic bone disease shown in FIG. 16B, in accordance with some embodiments of the present disclosure.
Figure 16A:
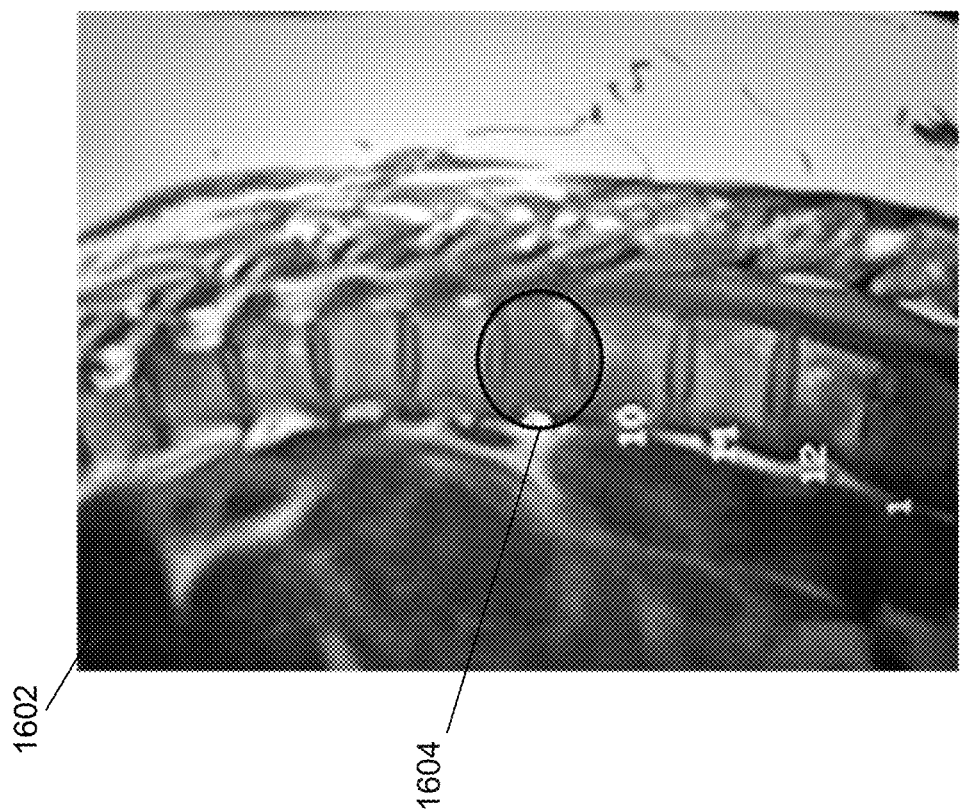
FIG. 16A illustrates an MRI image of a spine from a patient with metastatic bone disease, in accordance with some embodiments of the present disclosure.

FIG. 16A illustrates an MRI image 1602 of a spine from a patient with metastatic bone disease, visible at least at 1604. FIG. 16B illustrates an x-ray image 1606 from the spine of the patient with metastatic bone disease shown in FIG. 16A. The machine learning model disclosed herein is able to identify metastatic bone disease from the x-ray image 1606 based at least in part on features in the region at 1608. In some instances, a radiologist may not detect the metastatic bone disease based on the x-ray image causing a delay in a cancer diagnosis causing a delay in treatment and potentially significant negative ramifications to the patient (due to delayed treatment).

Figure 17:
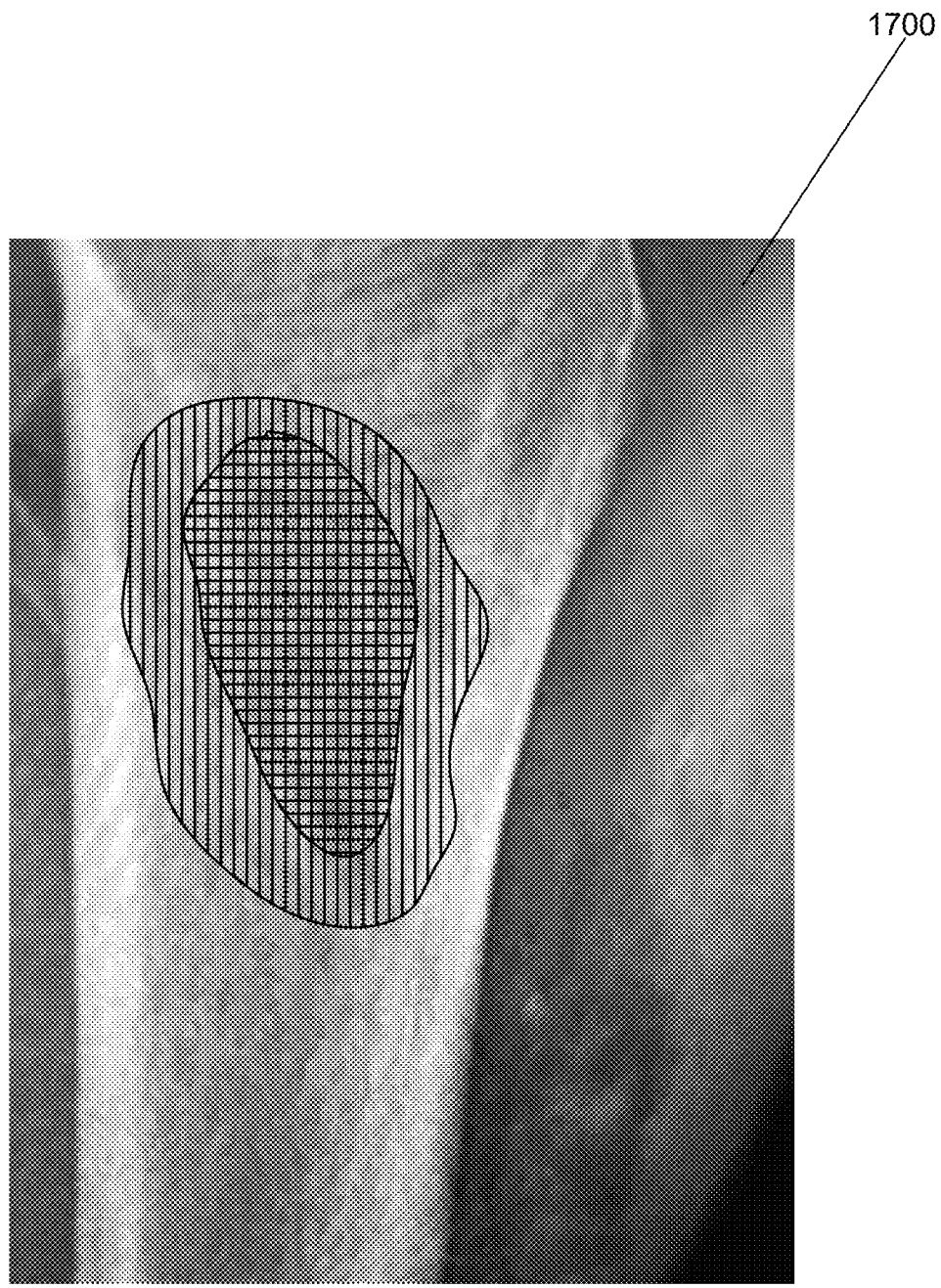
FIG. 17 illustrates an example output from the diagnosis predictor, in accordance with some embodiments of the present disclosure.

FIG. 17 illustrates an example output 1700 from the diagnosis predictor (e.g., the diagnosis predictor 104 illustrated and described in reference to FIG. 1). In some embodiments, the output 1700 is displayed on the x-ray image 702 of the diagnostic user interface 700 illustrated and described in reference to FIG. 7. The output 1700 includes a heat map identifying a region where a condition is likely to exist. In some embodiments, the heat map corresponds to the likelihood the abnormality is present at a location in the x-ray image. In FIG. 17, cross hatching represents different colors of a heatmap, including a first color identifying a first region and a second color identifying a second region. In this example, the second region is within the first region. The second region has a higher likelihood of the condition than the first region, and the first region has a higher likelihood than the surrounding region (outside of the first region). Although only two colors and two regions are illustrated, any number of regions and colors can be displayed in other embodiments. Additionally, a variety of alternative graphical representations can be generated in other embodiments other than heatmaps, and other than using different colors.

In some embodiments, the machine learning model outputs at least one of: (a) the x-ray image with a circle identifying the abnormality, (b) the x-ray image with a heatmap identifying the abnormality, (c) the x-ray image with an icon identifying and labeling the abnormality with a marker; or (d) any combination of (a), (b), and (c).

Another aspect of the present disclosure is a method of using a machine learning algorithm to analyze images to detect features indicative of conditions, the method comprising: receiving training lower detailed images with paired higher detailed images; annotating the training lower detailed images based on features identified in the higher detailed images; training a machine learning model using the lower detailed images; receiving an image of a same type as the lower detailed images; and generating a diagnosis prediction by processing the image with the machine learning model to detect one or more features in the image indicative of one or more conditions.

In some embodiments, the lower detailed images are images taken without contrast, and the higher detailed images are images taken with contrast. In some embodiments the type of the received image one that is taken without contrast.

Contrast is a type of dye that is sometimes used in medical imaging to enhance the visibility of internal structures in images such as CT, MRI, or x-ray images. Contrast can be administered into the body intravenously, such as through a manual injection, intravenous drip, or intravenous pump. Contrast can alternatively be administered into the body through an oral contrast that is ingested.

Contrast is often used to identify certain abnormalities that are presently thought to be difficult or impossible to identify from images taken without contrast, and as a result, contrast is often believed to be necessary in order to identify certain abnormalities in images. However, other abnormalities are thought to be easier to identify without contrast. Therefore, when contrast is used non-contrast images are typically first captured, prior to the contrast being administered. Then contrast images are also captured.

Some embodiments according to the present disclosure provide a technique (including a system, method or computer-readable medium) for identifying an abnormality from a non-contrast image. Such techniques enable abnormalities to be identified without requiring the use of contrast.

There are numerous benefits from being able to identify an abnormality in a non-contrast image. For example, some embodiments have decreased cost as compared with the cost of image acquisition involving administering of contrast. One reason for this is that no contrast is needed. Another reason for this is that fewer images can be captured (such as only the non-contrast images, without contrast image).

As another example benefit, the technique reduces radiation exposure to the patient by reducing the number of images that must be captured. Another example benefit is eliminating the risk of allergic reactions to the contrast.

Another example benefit is eliminating potential kidney dysfunction or damage that may be associated with the administration of intravenous contrast (which is more typical in high-risk patients such as diabetics and those with underlying kidney dysfunction). In fact, some patients with poor kidney function cannot receive IV contrast due to this risk, and therefore another benefit is the ability for such a patient to be able to have imaging performed in order to evaluate whether an abnormality is present.

As another example, the improved ability to identify lesions on the non-contrast CTs allows the identification of incidental abnormalities that otherwise would not typically be identified. These newly identified lesions may require further exploration and/or treatment in patients who did not have CTs with contrast and/or those who cannot receive contrast.

In some embodiments, AI algorithms are developed that identify abnormalities (such as lesions) on CT images without contrast that are typically difficult to identify on these images. Examples of lesions that are typically difficult to identify without contrast include lesions in the kidneys, liver, spleen, and pancreas. The AI algorithms training involves first identifying abnormalities using higher detailed CT images taken with intravenous (IV) and/or oral contrast. Then lower detailed images, such as CT images taken of the same patient but without contrast, are used for training the AI algorithms based on the abnormalities identified from the higher detailed images. An example objective is to identify lesions or other abnormalities without using contrast on CT scans by identifying abnormalities that are normally not perceptible or difficult to see on non-contrast CT scans.

Aspects of the present disclosure are described in the following clauses, which are consistent with but may also add to the present disclosure. The features or combinations of features disclosed in the following clauses may also be included in or combined with any of the other embodiments disclosed elsewhere herein. Additionally, the clauses may be combined with any other clauses to form another combination according to the present disclosure.

Clause 1 is a method of using a machine learning algorithm to analyze x-ray images to detect features indicative of conditions, the method comprising: receiving training x-ray images with paired higher detailed images; annotating the training x-ray images based on features identified in higher detailed images with or without input from a radiologist; training a machine learning model using the training x-ray images; receiving an x-ray image captured at an x-ray machine; and generating a diagnosis prediction by processing the x-ray image with the machine learning model to detect one or more features in the x-ray image indicative of one or more conditions.

Clause 2 is the method of clause 1, wherein the paired higher detailed images include at least one of: (a) one or more magnetic resonance imaging (MRI) images; (b) one or more computed tomography (CT) images; or (c) any combination of (a) and (b).

Clause 3 is the method of any one of clauses 1 and 2, wherein generating the diagnosis prediction includes identifying features in the x-ray images without information from a related higher detail image.

Clause 4 is the method of any clauses 1-3, the method comprising: for each condition of the one or more conditions, generating a probability that the x-ray image includes the condition.

Clause 5 is the method of any clauses 1-4, wherein annotating the training x-ray images includes at least one annotation identifying at least one soft-tissue condition.

Clause 6 is the method of clause 5, wherein the at least one soft tissue condition includes one or more of: (a) a meniscal tear; (b) wear in or absence of cartilage; (c) a tear in a ligament; or (d) any combination of (a), (b), and (c).

Clause 7 is the method of any one of clauses 1-6, wherein the machine learning model is trained to classify conditions as being acute, chronic, or subacute.

Clause 8 is the method of any clauses 1-7, wherein the x-ray images are of an abdomen and/or a chest, and the machine learning model is trained to identify abnormalities in the abdomen and/or the chest.

Clause 9 is the method of clause 8, wherein the abnormalities include one or more structural abnormalities including at least one of: (a) a tumors; (b) vessels; or (c) any combination of (a) and (b).

Clause 10 is the method of any one of clauses 1-9, the method further comprising: generating a user interface, accessible by one or more computing devices, to present the diagnosis prediction.

Clause 11 is the method of any one of clauses 1-10, wherein the training x-ray images and the paired higher detailed images are retrieved from a medical imaging database and the training x-ray images are paired with the paired higher detailed images based on the training x-ray images and the paired higher detailed images being: (1) from a same patient; (2) include a scan of a similar area of the same patient; and (3) captured within a predetermined time from each other.

Clause 12 includes annotating a series of x-ray images based on features identified on a series of paired higher detailed images, wherein the series of x-ray images and the series of paired higher detailed images are taken of the same region of the same patient overtime to track the proregression or a condition and/or treatment.

Clause 13 is the method of any clauses 1-12, wherein annotating the training x-ray images based on the features identified in the higher detailed images is performed manually by a radiologist.

Clause 14 is the method of clause 13, wherein the method further comprising: generating a user interface to annotate the training x-ray images, the user interface including inputs for annotating a displayed training x-ray image, a first window for displaying the displayed training x-ray image, and a second window for displaying a displayed paired higher detail image corresponding to the displayed training x-ray image.

Clause 15 is the method of any clauses 1-14, wherein the annotating is further based on input from a patient defining a physical state of the patient.

Clause 16 is the method of any clauses 1-15, wherein the machine learning model is one of deep convolutional neural network.

Clause 17 is the method of any clauses 1-16, the method further comprising: connecting with an electronic medical records service; and retrieving medical records from the electronic medical records service, the medical records related to a patient scanned in the x-ray image, wherein generating the diagnosis prediction is further based on the medical records.

Clause 18 is the method of any clauses 1-17, wherein the machine learning model outputs at least one of: (a) the x-ray image with a circle identifying the abnormality; (b) the x-ray image with a heatmap identifying the abnormality; (c) the x-ray image with an icon identifying and labeling the abnormality with a marker; or (d) any combination of (a), (b), and (c).

Clause 19 is the method of any clauses 1-18, wherein the one or more conditions includes an occult fracture.

Clause 20 is a diagnosis system comprising: an x-ray machine configured to take an x-ray image; and a computing system including: a communication interface to connect with the x-ray machine; at least one processor; and at least one memory device storing instructions which, when executed by the at least one processor, cause the computing system to: receive the x-ray image from the x-ray machine via the communication interface; and process the x-ray image with a machine learning model to generate a diagnosis prediction, wherein the machine learning model is trained using annotated x-ray images to detect one or more features in the x-ray image that are indicative of one or more conditions, where the annotated x-ray images include annotations based on features identified in paired higher detail images.

Clause 21 is the diagnosis system of clause 20, wherein to generate the diagnosis prediction includes to: identify the features in the x-ray image, without information from a higher detail image.

Clause 22 is the diagnosis system of clause 21, wherein for each identified feature of the features in the x-ray image, generating a probability that the identified feature is associated with a particular condition.

Clause 23 is the diagnosis system of any one of clauses 20-22, wherein the instructions are further configured to cause the computing system to perform any one of the methods of clauses 1-19.

Clause 24 is a system comprising: one or more servers with at least one processing device and at least one memory device, the at least one memory device storing instructions which, when executed by the at least one processing device, cause the system to: receive annotated training x-ray images, wherein the annotated training x-ray images include annotations based on features identified in paired higher detail images; train a machine learning model using the annotated training x-ray images; receive an x-ray image captured at an x-ray machine; and generate a diagnosis prediction by processing the x-ray image with the machine learning model to detect one or more features in the x-ray image indicative of one or more conditions.

Clause 25 is the system of clause 24, wherein the instructions are further configured to cause the system to perform any one of the methods of clauses 1-19.

Clause 26 is a method of using a machine learning algorithm to analyze images to detect features indicative of conditions, the method comprising: receiving training lower detailed images with paired higher detailed images; annotating the training lower detailed images based on features identified in the higher detailed images; training a machine learning model using the lower detailed images; receiving an image of a same type as the lower detailed images; and generating a diagnosis prediction by processing the image with the machine learning model to detect one or more features in the image indicative of one or more conditions.

Clause 27 is the method of clause 26, wherein the lower detailed images are images taken without contrast, and the higher detailed images are images taken with contrast.

Clause 28 is the method of any one of clauses 26-27, wherein the type of the received image one that is taken without contrast.

Clause 29, is the method of any one of clauses 26-28, wherein the contrast is an intravenous contrast.

Clause 30, is the method of any one of clauses 26-28, wherein the contrast is an oral contrast.

Clause 31, is the method of any one of clauses 27-30, wherein the one or more conditions include one or more lesions in a kidney, a liver, a spleen, a pancreas, or another organ.

Clause 32, wherein any one or more of the images are CT images.

Although various clauses are described herein, those of ordinary skill in the art will understand that many modifications may be made thereto within the scope of the present disclosure. Accordingly, it is not intended that the scope of the disclosure in any way be limited by the examples provided.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Additional steps may also be performed, and disclosed steps can be excluded (and/or performed optionally) without departing from the present disclosure. Furthermore, terms like "responsive to," "related to," or other past-tense adjectives are generally not intended to exclude such variants, unless context dictates otherwise.

What is claimed is:

1. A method of using a machine learning algorithm to analyze x-ray images to detect features indicative of conditions, the method comprising:
    receiving training x-ray images with paired higher detailed images;
    annotating the training x-ray images based on features identified in the higher detailed images;
    training a machine learning model using the training x-ray images;
    receiving an x-ray image captured at an x-ray machine; and
    generating a diagnosis prediction by processing the x-ray image with the machine learning model to detect one or more features in the x-ray image indicative of one or more conditions.

2. The method of claim 1, wherein the paired higher detailed images include at least one of:
    (a) one or more magnetic resonance imaging (MRI) images;
    (b) one or more computed tomography (CT) images; or
    (c) any combination of (a) and (b).

3. The method of claim 1, wherein generating the diagnosis prediction includes identifying features in the x-ray images without information from a related higher detail image.

4. The method of claim 1, the method comprising:
    for each condition of the one or more conditions, generating a probability that the x-ray image includes the condition.

5. The method of claim 1, wherein annotating the training x-ray images includes at least one annotation identifying at least one soft-tissue condition.

6. The method of claim 5, wherein the at least one soft tissue condition includes one or more of:
    (a) a meniscal tear;
    (b) wear in or absence of cartilage;
    (c) a tear in a ligament;
    (d) tendon injury;
    (e) muscle injury; or
    (f) any combination of (a), (b), (c), (d), and (f).

7. The method of claim 1, wherein the machine learning model is trained to classify conditions as being acute, chronic, or subacute.

8. The method of claim 1, wherein the x-ray images are of an abdomen and/or a chest, and the machine learning model is trained to identify abnormalities in the abdomen and/or the chest.

9. The method of claim 8, wherein the abnormalities include one or more structural abnormalities including at least one of:
    (a) a tumor;
    (b) vessels; or
    (c) any combination of (a) and (b).

10. The method of claim 1, the method further comprising:
    generating a user interface, accessible by one or more computing devices, to present the diagnosis prediction.

11. The method of claim 1, wherein the training x-ray images and the paired higher detailed images are retrieved from a medical imaging database and the training x-ray images are paired with the paired higher detailed images based on the training x-ray images and the paired higher detailed images being:
    (1) from a same patient;
    (2) include a scan of a similar area of the same patient; and
    (3) captured within a predetermined time from each other.

12. The method of claim 1, wherein a patient is treated based at least in part on the diagnosis prediction.

13. The method of claim 1, wherein annotating the training x-ray images based on the features identified in the higher detailed images is performed manually by a radiologist.

14. The method of claim 13, wherein the method further comprising:
  generating a user interface to annotate the training x-ray images, the user interface including inputs for annotating a displayed training x-ray image, a first window for displaying the displayed training x-ray image, and a second window for displaying a displayed paired higher detail image corresponding to the displayed training x-ray image.

15. The method of claim 1, wherein the machine learning model is one of a deep convolutional neural network or a vision transformer.

16. The method of claim 1, the method further comprising:
  connecting with an electronic medical records service;
  retrieving medical records from the electronic medical records service, the medical records related to a patient scanned in the x-ray image, wherein generating the diagnosis prediction is further based on the medical records.

17. A diagnosis system comprising:
  an x-ray machine configured to take an x-ray image; and
  a computing system including:
    a communication interface to connect with the x-ray machine;
    at least one processor; and
    at least one memory device storing instructions which, when executed by the at least one processor, cause the computing system to:
      receive the x-ray image from the x-ray machine via the communication interface; and
      process the x-ray image with a machine learning model to generate a diagnosis prediction, wherein the machine learning model is trained using annotated x-ray images to detect one or more features in the x-ray image that are indicative of one or more conditions, where the annotated x-ray images include annotations based on features identified in paired higher detail images.

18. The diagnosis system of claim 17, wherein to generate the diagnosis prediction includes to:
  identify the features in the x-ray image, without information from a higher detail image.

19. The diagnosis system of claim 18, wherein for each identified feature of the features in the x-ray image, generating a probability that the identified feature is associated with a particular condition.

20. A system comprising:
  one or more servers with at least one processing device and at least one memory device, the at least one memory device storing instructions which, when executed by the at least one processing device, cause the system to:
    receive annotated training x-ray images, wherein the annotated training x-ray images include annotations based on features identified in paired higher detail images;
    train a machine learning model using the annotated training x-ray images;
    receive an x-ray image captured at an x-ray machine; and
    generate a diagnosis prediction by processing the x-ray image with the machine learning model to detect one or more features in the x-ray image indicative of one or more conditions.

21. The system of claim 20, wherein the machine learning model outputs at least one of:
  (a) the x-ray image with a circle identifying the abnormality;
  (b) the x-ray image with a heatmap identifying the abnormality;
  (c) the x-ray image with an icon identifying and labeling the abnormality with a marker; or
  (d) any combination of (a), (b), and (c).

22. They system of claim 20, wherein the one or more conditions includes an occult fracture.

* * * * *